(12) United States Patent
Jafari et al.

(10) Patent No.: US 11,539,430 B2
(45) Date of Patent: Dec. 27, 2022

(54) CODE DIVISION MULTIPLE ACCESS OPTICAL SUBCARRIERS

(71) Applicant: Infinera Corporation, Sunnyvale, CA (US)

(72) Inventors: Amir Jafari, Ottawa (CA); David F. Welch, Atherton, CA (US); Steven Joseph Hand, Los Gatos, CA (US); Mohamed Osman, Ottaw (CA)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 16/809,504

(22) Filed: Mar. 4, 2020

(65) Prior Publication Data
US 2020/0287648 A1    Sep. 10, 2020

Related U.S. Application Data

(60) Provisional application No. 62/813,151, filed on Mar. 4, 2019.

(51) Int. Cl.
*H04B 10/50* (2013.01)
*H04B 7/26* (2006.01)
(Continued)

(52) U.S. Cl.
CPC ....... *H04B 7/2656* (2013.01); *H04B 10/0773* (2013.01); *H04B 10/0793* (2013.01);
(Continued)

(58) Field of Classification Search
CPC ....... H04B 10/5055; H04B 10/61–6166; H04J 14/005; H04J 14/007
See application file for complete search history.

(56) References Cited

U.S. PATENT DOCUMENTS

| 4,483,000 A | 11/1984 | Yamamoto et al. |
| 4,528,565 A | 7/1985 | Hauptmann |

(Continued)

FOREIGN PATENT DOCUMENTS

| EP | 0512642 | 11/1992 |
| EP | 3208957 | 8/2017 |

(Continued)

OTHER PUBLICATIONS

V. R. Arbab, W.-R. Peng, X. Wu, and A. E. Willner, "Experimental demonstration of multicarrier-CDMA for passive optical networks," in Proc. 34th, Eur. Conf. Opt. Commun., Brussels, Belgium, 2008, Paper We.1.F.1. (Year: 2008).*

(Continued)

*Primary Examiner* — Nathan M Cors
(74) *Attorney, Agent, or Firm* — David L. Soltz

(57) ABSTRACT

Consistent the present disclosure, a network or system is provided in which a hub or primary node may communication with a plurality of leaf or secondary nodes. The hub node may operate or have a capacity that may be greater than that of the leaf nodes. Accordingly, relatively inexpensive leaf nodes may be deployed that receive data carrying optical signals from and supply data carrying optical signals to the hub node. One or more connections may couple each leaf node to the hub node, whereby each connection may include one or more spans or segments of optical fibers, optical amplifiers, and optical add/drop multiplexer, for example. Consistent with an aspect of the present disclosure, optical subcarriers may be transmitted over such connections. The subcarriers may be generated by a combination of a laser and a modulator, such that multiple lasers and modulators are not required, and costs may be reduced. In addition, the subcarriers may be employed using multiple access techniques, such as frequency division multiplexing (Continued)

(FDM), code-division multiple access (CDMA), and time-division multiple access so that the primary node can communicate with a relatively large number of secondary nodes. In addition, an out-of-band control channel may be provided to carry OAM information from the primary node to the secondary nodes, as well as from the secondary nodes to the primary nodes.

18 Claims, 24 Drawing Sheets

(51) Int. Cl.
| | |
|---|---|
| *H04B 10/548* | (2013.01) |
| *H04B 10/61* | (2013.01) |
| *H04B 10/69* | (2013.01) |
| *H04J 14/02* | (2006.01) |
| *H04L 1/00* | (2006.01) |
| *H04L 5/00* | (2006.01) |
| *H04J 14/08* | (2006.01) |
| *H04J 14/00* | (2006.01) |
| *H04B 10/077* | (2013.01) |
| *H04B 10/079* | (2013.01) |
| *H04B 10/25* | (2013.01) |
| *H04B 10/40* | (2013.01) |
| *H04Q 11/00* | (2006.01) |
| *H04B 10/2575* | (2013.01) |

(52) U.S. Cl.
CPC ....... *H04B 10/25* (2013.01); *H04B 10/25754* (2013.01); *H04B 10/40* (2013.01); *H04B 10/503* (2013.01); *H04B 10/504* (2013.01); *H04B 10/505* (2013.01); *H04B 10/548* (2013.01); *H04B 10/61* (2013.01); *H04B 10/613* (2013.01); *H04B 10/69* (2013.01); *H04J 14/005* (2013.01); *H04J 14/0298* (2013.01); *H04J 14/08* (2013.01); *H04J 99/00* (2022.08); *H04L 1/0041* (2013.01); *H04L 1/0045* (2013.01); *H04L 1/0071* (2013.01); *H04L 5/001* (2013.01); *H04Q 11/0005* (2013.01); *H04Q 11/0067* (2013.01); *H04Q 2011/0015* (2013.01); *H04Q 2011/0035* (2013.01); *H04Q 2011/0079* (2013.01)

(56) References Cited

U.S. PATENT DOCUMENTS

| | | | |
|---|---|---|---|
| 5,153,762 A | 10/1992 | Huber | |
| 5,208,692 A | 5/1993 | McMahon | |
| 5,596,436 A | 1/1997 | Sargis | |
| 5,822,094 A | 10/1998 | O'Sullivan | |
| 5,825,857 A | 10/1998 | Reto | |
| 6,046,838 A | 4/2000 | Kou | |
| 6,362,913 B2 | 3/2002 | Ooi et al. | |
| 6,525,857 B1 | 2/2003 | Way | |
| 6,563,880 B1 | 5/2003 | Hunsinger et al. | |
| 6,580,544 B1 | 6/2003 | Lin et al. | |
| 6,687,044 B2 | 2/2004 | Paquet | |
| 6,775,840 B1* | 8/2004 | Naegel | H04L 12/2801 348/E17.001 |
| 7,076,168 B1* | 7/2006 | Shattil | H04B 10/25752 398/202 |
| 7,266,306 B1 | 9/2007 | Harley et al. | |
| 7,466,919 B1 | 2/2008 | Birk et al. | |
| 7,346,284 B2 | 3/2008 | Wan | |
| 7,376,358 B2 | 5/2008 | Roberts et al. | |
| 7,447,436 B2 | 11/2008 | Yee | |
| 7,701,842 B2 | 4/2010 | Roberts et al. | |
| 7,715,710 B2 | 5/2010 | Wan | |
| 7,729,621 B2 | 6/2010 | Nahapetian et al. | |
| 7,756,421 B2 | 7/2010 | Roberts | |
| 7,826,752 B1 | 11/2010 | Zanoni | |
| 8,184,992 B2 | 5/2012 | Kikuchi | |
| 8,203,777 B2 | 6/2012 | Smith et al. | |
| 8,412,047 B2 | 4/2013 | Tanaka | |
| 8,437,645 B2 | 5/2013 | Boffi et al. | |
| 8,472,810 B2 | 6/2013 | Akiyama | |
| 8,477,056 B2 | 7/2013 | Sun et al. | |
| 8,477,656 B2 | 7/2013 | O'Mahony | |
| 8,478,137 B2 | 7/2013 | Komaki et al. | |
| 8,655,190 B2 | 2/2014 | Wu et al. | |
| 8,682,180 B1 | 3/2014 | Nimon et al. | |
| 8,730,079 B2 | 5/2014 | Tudose | |
| 8,768,177 B2 | 7/2014 | Wu et al. | |
| 8,861,977 B2 | 10/2014 | McNicol | |
| 8,929,750 B2 | 1/2015 | Ishihara | |
| 8,965,203 B1 | 2/2015 | Vahdat | |
| 8,971,723 B2 | 3/2015 | Le Taillandier De Gabory | |
| 8,989,593 B2 | 3/2015 | Sun et al. | |
| 9,020,363 B2 | 4/2015 | Yasuda | |
| 9,048,957 B2 | 6/2015 | Nakashima | |
| 9,112,609 B2 | 8/2015 | Kim et al. | |
| 9,154,231 B2 | 10/2015 | Kaneda | |
| 9,166,692 B1 | 10/2015 | Felderman | |
| 9,197,320 B2 | 11/2015 | Vassilieva | |
| 9,244,928 B1 | 1/2016 | Nishimoto | |
| 9,270,379 B2 | 2/2016 | Huang et al. | |
| 9,281,915 B2 | 3/2016 | Kaneda | |
| 9,363,585 B2 | 6/2016 | Carpini | |
| 9,419,720 B2 | 8/2016 | Akiyama | |
| 9,461,749 B2 | 10/2016 | Jansen et al. | |
| 9,485,554 B1 | 11/2016 | Kim | |
| 9,553,675 B2 | 1/2017 | Karar et al. | |
| 9,608,866 B2 | 3/2017 | Nagarajan | |
| 9,673,907 B1 | 6/2017 | Vassilieva | |
| 9,686,020 B2 | 6/2017 | Mochizuki et al. | |
| 9,705,592 B1 | 7/2017 | Schmogrow | |
| 9,735,881 B1 | 8/2017 | Agazzi et al. | |
| 9,991,953 B1 | 6/2018 | Fludger | |
| 10,014,975 B2 | 7/2018 | Krause et al. | |
| 10,027,424 B2 | 7/2018 | Zhuge et al. | |
| 10,243,653 B2 | 3/2019 | Wiswell | |
| 10,243,688 B2 | 3/2019 | Vassilieva | |
| 10,348,410 B1 | 7/2019 | Charlton | |
| 10,374,623 B1 | 8/2019 | Oveis Gharan | |
| 10,374,721 B2 | 8/2019 | Awadalla | |
| 10,389,447 B1 | 8/2019 | Khandani | |
| 10,397,190 B2 | 8/2019 | Akhavain Mohammadi et al. | |
| 10,491,302 B1 | 11/2019 | Morris | |
| 10,523,315 B2 | 12/2019 | Jiang | |
| 10,547,388 B2 | 1/2020 | Ikeda | |
| 10,574,362 B2 | 2/2020 | Chen | |
| 10,587,358 B1 | 3/2020 | Ebrahimzad | |
| 2002/0003641 A1 | 1/2002 | Hall | |
| 2002/0005971 A1 | 1/2002 | Sasai | |
| 2002/0034194 A1 | 3/2002 | Shattil | |
| 2002/0067883 A1 | 6/2002 | Lo | |
| 2002/0114038 A1 | 8/2002 | Arnon | |
| 2002/0122518 A1 | 9/2002 | Yasuda et al. | |
| 2002/0145783 A1 | 10/2002 | Chang | |
| 2003/0020995 A1 | 1/2003 | Harasawa | |
| 2003/0152386 A1* | 8/2003 | Vohra | H04J 14/0282 398/76 |
| 2003/0223751 A1 | 12/2003 | Shimizu | |
| 2004/0016874 A1 | 1/2004 | Rao | |
| 2004/0019459 A1 | 1/2004 | Dietz | |
| 2004/0032643 A1 | 2/2004 | Chimfwembe | |
| 2004/0033074 A1 | 2/2004 | Hsu | |
| 2004/0105682 A1 | 6/2004 | Roberts | |
| 2004/0197103 A1 | 7/2004 | Roberts | |
| 2004/0151109 A1 | 8/2004 | Batra | |
| 2004/0198265 A1 | 10/2004 | Wallace | |
| 2004/0208614 A1 | 10/2004 | Price | |
| 2004/0223763 A1* | 11/2004 | Lee | H04J 14/0247 398/78 |
| 2004/0252996 A1 | 12/2004 | McNicol | |
| 2005/0008085 A1 | 1/2005 | Lee | |
| 2005/0041972 A1* | 2/2005 | Kim | H04L 1/0026 398/78 |

(56) References Cited

U.S. PATENT DOCUMENTS

| | | |
|---|---|---|
| 2005/0074037 A1 | 4/2005 | Rickard |
| 2005/0111789 A1 | 5/2005 | Hayes |
| 2005/0147415 A1 | 7/2005 | Fee |
| 2005/0169585 A1 | 8/2005 | Aronson |
| 2005/0175112 A1 | 8/2005 | Pisani |
| 2005/0175339 A1 | 8/2005 | Herskowits |
| 2006/0078336 A1 | 4/2006 | McNicol et al. |
| 2006/0093052 A1 | 5/2006 | Cho |
| 2006/0159454 A1 | 7/2006 | Bjornstad |
| 2006/0215540 A1 | 9/2006 | Krishnamoorthi |
| 2006/0233147 A1 | 10/2006 | Karabinis |
| 2006/0269295 A1 | 11/2006 | Way |
| 2006/0280510 A1 | 12/2006 | Onaka |
| 2007/0004465 A1 | 1/2007 | Papasakellariou |
| 2007/0025421 A1 | 2/2007 | Shattil |
| 2007/0092263 A1 | 4/2007 | Agazzi |
| 2008/0063409 A1 | 3/2008 | Toliver |
| 2008/0085125 A1 | 4/2008 | Frankel |
| 2008/0232816 A1 | 9/2008 | Hoshida |
| 2008/0267630 A1 | 10/2008 | Qian |
| 2009/0110033 A1 | 4/2009 | Shattil |
| 2009/0154336 A1 | 6/2009 | Green |
| 2009/0190929 A1 | 7/2009 | Khurgin |
| 2009/0196603 A1 | 8/2009 | Zhou |
| 2009/0214224 A1 | 8/2009 | Cho |
| 2009/0232234 A1 | 9/2009 | Du |
| 2009/0238578 A1 | 9/2009 | Taylor |
| 2009/0238580 A1 | 9/2009 | Kikuchi |
| 2009/0257344 A1 | 10/2009 | Huang |
| 2009/0257755 A1 | 10/2009 | Buelow |
| 2009/0292389 A1 | 11/2009 | Wei |
| 2010/0021163 A1 | 1/2010 | Shieh |
| 2010/0021166 A1 | 1/2010 | Way |
| 2010/0028002 A1 | 2/2010 | Qian |
| 2010/0086303 A1 | 4/2010 | Qian |
| 2010/0142964 A1 | 6/2010 | Chang et al. |
| 2010/0142967 A1 | 6/2010 | Perez |
| 2010/0178057 A1 | 7/2010 | Shieh |
| 2010/0189445 A1 | 7/2010 | Nakashima |
| 2010/0215368 A1 | 8/2010 | Qian |
| 2010/0246581 A1 | 9/2010 | Henry |
| 2010/0254707 A1 | 10/2010 | Peng |
| 2010/0329671 A1 | 12/2010 | Essiambre |
| 2010/0329683 A1 | 12/2010 | Liu |
| 2011/0097092 A1 | 4/2011 | Wagner et al. |
| 2011/0135301 A1 | 6/2011 | Myslinski |
| 2011/0142450 A1 | 6/2011 | Tanzi et al. |
| 2011/0150475 A1 | 6/2011 | Soto et al. |
| 2011/0176813 A1 | 7/2011 | Kim |
| 2011/0182577 A1 | 7/2011 | Wu |
| 2011/0249978 A1 | 10/2011 | Sasaki |
| 2011/0255870 A1 | 10/2011 | Grigoryan |
| 2012/0002703 A1 | 1/2012 | Yamashita |
| 2012/0033965 A1 | 2/2012 | Zhang |
| 2012/0045209 A1 | 2/2012 | Boyd |
| 2012/0082466 A1 | 4/2012 | Wu |
| 2012/0093510 A1 | 4/2012 | Zhang |
| 2012/0099864 A1 | 4/2012 | Ishihara |
| 2012/0141130 A1 | 6/2012 | Nakashima |
| 2012/0141135 A1 | 6/2012 | Yang |
| 2012/0148264 A1 | 6/2012 | Liu |
| 2012/0219285 A1 | 8/2012 | Dahan |
| 2012/0251119 A1 | 10/2012 | McNicol |
| 2012/0251121 A1 | 10/2012 | McNicol |
| 2012/0263471 A1 | 10/2012 | Buchali |
| 2012/0269510 A1 | 10/2012 | Hui |
| 2012/0269515 A1 | 10/2012 | Cvijetic |
| 2013/0070785 A1 | 3/2013 | Liu |
| 2013/0070786 A1 | 3/2013 | Liu |
| 2013/0101296 A1 | 4/2013 | Nishimoto |
| 2013/0108271 A1 | 5/2013 | Tang et al. |
| 2013/0136449 A1 | 5/2013 | Liu |
| 2013/0170834 A1 | 7/2013 | Cho et al. |
| 2013/0191877 A1 | 7/2013 | Rakib |
| 2013/0195452 A1 | 8/2013 | Hui |
| 2013/0202303 A1 | 8/2013 | Wilkinson |
| 2013/0251364 A1 | 9/2013 | Pachnicke |
| 2013/0286847 A1 | 10/2013 | Schmidt |
| 2014/0010543 A1 | 1/2014 | Lee |
| 2014/0056371 A1 | 2/2014 | Ji |
| 2014/0072303 A1 | 3/2014 | Pfau |
| 2014/0079390 A1 | 3/2014 | Kim |
| 2014/0079391 A1 | 3/2014 | Kim |
| 2014/0092924 A1 | 4/2014 | Krause et al. |
| 2014/0099116 A1 | 4/2014 | Bai |
| 2014/0126916 A1 | 5/2014 | Ota |
| 2014/0153925 A1 | 6/2014 | Nishihara et al. |
| 2014/0205286 A1 | 7/2014 | Ji et al. |
| 2014/0233963 A1 | 8/2014 | Le Taillandier De Gabory |
| 2014/0241727 A1 | 8/2014 | Lim et al. |
| 2014/0270759 A1 | 9/2014 | Djordjevic |
| 2014/0270761 A1 | 9/2014 | Xu |
| 2014/0270803 A1 | 9/2014 | Olsson |
| 2014/0294381 A1 | 10/2014 | McNicol |
| 2014/0314411 A1 | 10/2014 | Huang |
| 2014/0314416 A1 | 10/2014 | Vassilieva |
| 2014/0341587 A1 | 11/2014 | Nakashima |
| 2014/0363164 A1 | 12/2014 | Kim |
| 2014/0376930 A1 | 12/2014 | Shiba |
| 2015/0063808 A1 | 3/2015 | Xia |
| 2015/0071642 A1 | 3/2015 | Tanaka |
| 2015/0093118 A1 | 4/2015 | Jia |
| 2015/0098700 A1 | 4/2015 | Zhu |
| 2015/0117860 A1 | 4/2015 | Braun |
| 2015/0125160 A1 | 5/2015 | Wen |
| 2015/0188637 A1 | 7/2015 | Tanimura |
| 2015/0188642 A1 | 7/2015 | Sun |
| 2015/0229332 A1 | 8/2015 | Yuan |
| 2015/0229401 A1 | 8/2015 | Tanaka |
| 2015/0280853 A1 | 10/2015 | Sun |
| 2015/0288456 A1 | 10/2015 | Zhu |
| 2015/0289035 A1 | 10/2015 | Mehrvar |
| 2015/0296278 A1 | 10/2015 | Liu |
| 2015/0333860 A1 | 11/2015 | Rahn |
| 2016/0013881 A1 | 1/2016 | Rejaly et al. |
| 2016/0029403 A1 | 1/2016 | Roy et al. |
| 2016/0050021 A1 | 2/2016 | Hua |
| 2016/0057516 A1 | 2/2016 | Hochberg |
| 2016/0094292 A1 | 3/2016 | Mochizuki |
| 2016/0099777 A1 | 4/2016 | Liu |
| 2016/0112141 A1 | 4/2016 | Rahn |
| 2016/0142150 A1 | 5/2016 | Lyubomirsky |
| 2016/0191168 A1 | 6/2016 | Huang |
| 2016/0192042 A1 | 6/2016 | Mitchell |
| 2016/0197681 A1 | 7/2016 | Sun |
| 2016/0218812 A1 | 7/2016 | Okabe |
| 2016/0233963 A1 | 8/2016 | Zhuge et al. |
| 2016/0261347 A1 | 9/2016 | Karar |
| 2016/0277816 A1 | 9/2016 | Yuang |
| 2016/0316281 A1 | 10/2016 | Keyworth |
| 2016/0323039 A1 | 11/2016 | Sun et al. |
| 2017/0005747 A1 | 1/2017 | Kim |
| 2017/0019168 A1 | 1/2017 | Menard |
| 2017/0033864 A1 | 2/2017 | Nagarajan |
| 2017/0033999 A1 | 2/2017 | Nagarajan et al. |
| 2017/0041691 A1 | 2/2017 | Rickman |
| 2017/0054513 A1 | 2/2017 | Guo |
| 2017/0070313 A1 | 3/2017 | Kato |
| 2017/0078028 A1 | 3/2017 | Zhang |
| 2017/0078044 A1 | 3/2017 | Hino |
| 2017/0104535 A1 | 4/2017 | Hoshida |
| 2017/0134836 A1 | 5/2017 | Sindhy |
| 2017/0149507 A1 | 5/2017 | Le Taillandier De Gabory |
| 2017/0163347 A1 | 6/2017 | Akiyama |
| 2017/0222716 A1 | 8/2017 | Nakashima |
| 2017/0237500 A1 | 8/2017 | Nishimoto |
| 2017/0250775 A1 | 8/2017 | Kato |
| 2017/0324480 A1 | 11/2017 | Elmirghani |
| 2017/0366267 A1 | 12/2017 | Campos |
| 2017/0367061 A1 | 12/2017 | Kim |
| 2018/0034555 A1 | 2/2018 | Goh |
| 2018/0115407 A1 | 4/2018 | Melikyan |
| 2018/0120520 A1 | 5/2018 | Kelly |
| 2018/0145761 A1 | 5/2018 | Zhuge |

(56) References Cited

U.S. PATENT DOCUMENTS

| | | |
|---|---|---|
| 2018/0198547 A1 | 7/2018 | Mehrvar |
| 2018/0219632 A1 | 8/2018 | Yoshida |
| 2018/0234285 A1 | 8/2018 | Djordjevic |
| 2018/0241476 A1 | 8/2018 | Johnson |
| 2018/0278331 A1 | 9/2018 | Cao |
| 2018/0324717 A1 | 11/2018 | Zhou |
| 2018/0359047 A1 | 12/2018 | Vassilieva |
| 2019/0020409 A1 | 1/2019 | Le Taillandier De Gabory |
| 2019/0097728 A1 | 3/2019 | Frankel |
| 2019/0123819 A1 | 4/2019 | Jiang |
| 2019/0149242 A1 | 5/2019 | Torbatian |
| 2019/0149389 A1 | 5/2019 | Torbatian |
| 2019/0253153 A1 | 8/2019 | Sun |
| 2019/0260493 A1 | 8/2019 | Chimfwembe |
| 2019/0288777 A1 | 9/2019 | Ishimura |
| 2019/0312640 A1 | 10/2019 | Binkai |
| 2020/0014418 A1* | 1/2020 | Yu ................... H04B 10/541 |
| 2020/0076508 A1 | 3/2020 | Jia |
| 2020/0177525 A1 | 6/2020 | Morris |

FOREIGN PATENT DOCUMENTS

| | | |
|---|---|---|
| WO | WO 2012100714 | 8/2012 |
| WO | WO 2014114332 | 7/2014 |

OTHER PUBLICATIONS

J. Leuthold et al., "Super Channels Based on Nyquist Multiplexing," 2012 17th Opto-Electronics and Communications Conference (OECC 2012) Technical Digest, Jul. 2012, Busan, Kor.

S. Watanabe et al., "Optical Coherent Broad-Band Transmission for Long-Haul and Distribution Systems Using Subcarrier Multiplexing," Journal Of Lightwave Technology, vol. 11, No. 1, Jan. 1993, pp. 116-127.

M. Jinno et al., "Demonstration of Novel Spectrum-Efficient Elastic Optical Path Network with Per-Channel Variable Capacity of 40 Gb/s to Over 400 Gb/s," ECOC 2008, Sep. 21-25, 2008, Brussels, Belgium, Th.3.F.6.

Y. Chen et al., "Experimental Demonstration Of Roadm Functionality On An Optical Scfdm Superchannel," IEEE Photonics Technology Letters, vol. 24, No. 3, Feb. 1, 2012, pp. 215-217.

Adaptive Software Defined Terabit Transceiver For Flexible Optical Networks, Public executive summary of the Final Project Periodic Report, Jun. 16, 2016.

Hillerkus, Single-Laser Multi-Terabit/s Systems, KIT Scientific Publishing, 2013, Chapters 1, 3, and 6.

Hu et al., "Flexible and Concurrent All-Optical VPN in OFDMA PON," IEEE Photonics Technology Journal, vol. 5, No. 6, Dec. 2013.

Bosco et al., "On the Performance of Nyquist-WDM Terabit Superchannels Based on PM-BPSK, PM-QPSK, PM-8QAM or PM-16QAM Subcarriers," Journal Of Lightwave Technology, vol. 29, No. 1, Jan. 1, 2011, pp. 53-60.

K. Roberts et al., "Flexible Transceivers," ECOC Technical Digest, 2012, We.3.A.3.

K. Roberts et al., "High CapacityTransport—100G and Beyond," Journal Of Lightwave Technology, vol. 33, No. 3, Feb. 1, 2015, pp. 563-578.

J. Reis et al., "Performance Optimization Of Nyquist Signaling For Spectrally Efficient Optical Access Networks [Invited]," J. Opt. Commun. Netw./vol. 7, No. 2, Feb. 2015, pp. A200-A208.

R. Ferreira et al, Coherent Nyquist UDWDM-PON With Digital Signal Processing in Real Time, Journal Of Lightwave Technology, vol. 34, No. 2, Jan. 15, 2016, pp. 826-833.

A. Shahpari et al., "Coherent Access: A Review", Journal Of Lightwave Technology, vol. 35, No. 4, Feb. 15, 2017, pp. 1050-1058.

P. Layec et al., "Rate-Adaptable Optical Transmission And Elastic Optical Networks," Chapter 15, Enabling Technologies for High Spectral-efficiency Coherent Optical Communication Networks, First Edition, 2016 John Wiley & Sons, Inc. Published 2016, pp. 507-545.

J. Altabas, "Cost-effective Transceiver based on a RSOA and a VCSEL for Flexible uDWDM Networks," IEEE Photonics Technology Letters ( vol. 28 , Issue: 10, May 15, 15, 2016, pp. 1111-1114.

K. Roberts et al., "Beyond 100 Gb/s: Capacity, Flexibility, and Network Optimization," J. Opt. Commun. Netw./vol. 9, No. 4/Apr. 2017, pp. C12-C24.

Lavery et al., "Digital Coherent Receivers for Long-Reach Optical Access Networks," Journal Of Lightwave Technology, vol. 31, No. 4, Feb. 15, 2013, pp. 609-620.

V. Vujicic, "Optical Multicarrier Sources for Spectrally Efficient Optical Networks," A Dissertation submitted in fulfilment of the requirements for the award of Doctor of Philosophy (Ph.D.) to the Dublin City University, Dec. 2015, Chapters 1, 2, and 6.

Straullu et al., "Single-Wavelength Downstream FDMA-PON at 32 Gbps and 34 dB ODN Loss," IEEE Photonics Technology Letters, vol. 27, No. 7, Apr. 1, 2015, pp. 774-777.

Y. Zhang et al., "Digital subcarrier multiplexing for flexible spectral allocation in optical transport network," Oct. 24, 2011 / vol. 19, No. 22 / Optics Express 21882.

R. Schmogrow et al., "Nyquist Frequency Division Multiplexing for Optical Communications," CLEO Technical Digest, OSA 2012, CTh1H.2.

P Khodashenas. "Investigation of Spectrum Granularity for Performance Optimization of Flexible Nyquist-WDM-Based Optical Networks." Journal Of Lightwave Technology, vol. 33, No. 23, Dec. 1, 2015 pp. 4767-4774.

Mishra et al., "Flexible RF-Based Comb Generator," IEEE Photonics Technology Letters, vol. 25, No. 7, Apr. 1, 2013, pp. 701-704.

M. Jinno et al., "Multiflow Optical Transponder for Efficient Multilayer Optical Networking," IEEE Communications Magazine • May 2012, pp. 56-65.

Kim Roberts, "100G and Beyond," OFC 2014, OSA 2014, Tu3J.1.

J. Fischer, "Digital signal processing for coherent UDWDM passive optical networks," ITG-Fachbericht 248: Photonische Netze 05.-06.05.2014 in Leipzig, VDE Verlag GMBH • Berlin • Offenbach, Germany, ISBN 978-3-8007-3604-1.

Kottke et al., "Coherent UDWDM PON with joint subcarrier reception at OLT," Optics Express, Jul. 2, 2014.

Lavery et al., "Reduced Complexity Equalization for Coherent Long-Reach Passive Optical Networks," J. Opt. Commun. Netw./vol. 7, No. 1/Jan. 2015, pp. A16-A27.

Lazaro et al., "Flexible PON KeyTechnologies: Digital Advanced Modulation Formats and Devices," 2014 16th International Conference on Transparent Optical Networks (ICTON), Tu.B3.2.

Optical Internetworking Forum—Technology Options for 400G Implementation OIF-Tech-Options-400G-01.0, Jul. 2015.

Riccardi et al., "Sliceable bandwidth variable transponder: the IDEALIST vision," 2015 European Conference on Networks and Communications (EuCNC), pp. 330-334.

Sambo et al., "Next Generation Sliceable Bandwidth Variable Transponders," IEEE Communications Magazine, Feb. 2015, pp. 163-171.

P. Schindler et al., "Colorless FDMA-PON With Flexible Bandwidth Allocation and Colorless, Low-Speed ONUs [Invited]," J. Opt. Commun. Netw./vol. 5, No. 10/Oct. 2013, pp. A204-A212.

Schmogrow et al., "Real-time Nyquist signaling with dynamic precision and flexible non-integer oversampling," Jan. 13, 2014 | vol. 22, No. 1 | DOI:10.1364/OE.22.000193 | Optics Express 193.

Schmogrow et al., "Real-Time Digital Nyquist-WDM and OFDM Signal Generation: Spectral Efficiency Versus DSP Complexity," ECOC Technical Digest, 2012 OSA, Mo.2.A.4.

S. Smolorz et al., "Demonstration of a Coherent UDWDM-PON with Real-Time Processing," OFC/NFOEC 2011, PDPD4.

H. Rohde et al. "Coherent Ultra Dense WDM Technology for Next Generation Optical Metro and Access Networks," Journal Of Lightwave Technology, vol. 32, No. 10, May 15, 2014 pp. 2041-2052.

Ze Dong et al., "Very-High-Throughput Coherent Ultradense WDM-PON Based on Nyquist-ISB Modulation," IEEE Photonics Technology Letters, vol. 27, No. 7, Apr. 1, 2015, pp. 763-766.

(56) References Cited

OTHER PUBLICATIONS

Rohde et al., "Digital Multi-Wavelength Generation and Real Time Video Transmission in a Coherent Ultra Dense WDM PON," OFC/NFOEC Technical Digest, 2013 OSA, OM3H.3.

International Search Report issued in connection with PCT/US2020/023871 dated Sep. 24, 2020.

Guo-Wei Lu et al., "Optical subcarrier processing for Nyquist SCM signals via coherent spectrum overlapping in four-wave mixing with coherent multi-tone pump", Optics Express, vol. 26, No. 2, Jan. 22, 2018.

International Search Report issued in connection with PCT/US2020/018180 dated Sep. 18, 2020.

International Search Report issued in connection with PCT/US2020/036209 dated Oct. 1, 2020.

International Search Report issued in connection with PCT/US2020/018292 dated Jun. 4, 2020.

International Search Report issued in connection with PCT/US2020/021024 dated Aug. 3, 2020.

Wei et al: Mac Protocols for Optical Orthogonal Frequency Division Multiple Access (OFDMA)-based Passive Optical Networks, OFC/NFOEC 2008, paper JWA82, Feb. 24-28, 2008 (Year: 2008).

Cerisola et al., "Subcarrier multiplex of packet headers in a WDM optical network and a nouvel ultrafast header clock-recovery technique", 1995, OFC '95 Technical Digest, pp. 273-274 (Year: 1995).

Michael G. Taylor, "Coherent Detection Method Using DSP for Demodulation of Signal and Subsequent Equalization of Propagation Impairments," IEEE Photonics Technology Letters, vol. 16, No. 2, Feb. 2004, pp. 674-676.

K. Roberts, et al., "Performance of dual-polarization QPSK for optical transport system," JLT, vol. 27, No. 16, pp. 3546-3559, Aug. 2009.

S.J. Savory et al., "Digital equalisation of 40Gbit/s per wavelength transmission over 2480km of standard fibre without optical dispersion compensation, " European Conference on Optical Communications (ECOC) 2006, paper Th2.5.5.

H. Sun et al., "Real-time measurements of a 40 Gb/S coherent system," Jan. 21, 2008, vol. 16, No. 2, Optics Express, pp. 873-879.

Greshishchev et al., "A 56GS/s 6b DAC in 65nm CMOS with 256×6b Memory", ISSCC 2011/Session 1 0/Nyquist-Rate Converters/1 0.8, 2011 IEEE International Solid-State Circuits Conference, 3 pages.

Bingham, "Multicarrier Modulator for Data Transmission: An Idea Whose Time Has Come", IEEE Communications Magazine, pp. 5-14, May 1990, 8 pages.

Yan et al. "Experimental Comparison of No-Guard-Interval-OFDM and Nyquist-WDM Superchannels", OFC/NFOEC Techincal Digest, Jan. 23, 20212, 4 pages.

Zhuge et al., "Comparison of Intra-Channel Nonlinearity Tolerance Between Reduced-Guard-Interval CO-OFDM Systems and Nyquist Single Carrier Systems", OFC/NFOEC Technical Digest, Jan. 23, 2012, 4 pages.

Zhang et al., "3760km, 100G SSMF Transmission over Commercial Terrestrial DWDM ROADM Systems using SD-FEC", OFC/NFOEC Postdeadline Papers, Mar. 2012, 3 pages.

Rahn et al., "250Gb/s Real-Time PIC-based Super-Channel Transmission Over a Gridless 6000km Terrestrial Link", OFC/NFOEC Posteadline Papers, Mar. 2012,3 pages.

* cited by examiner

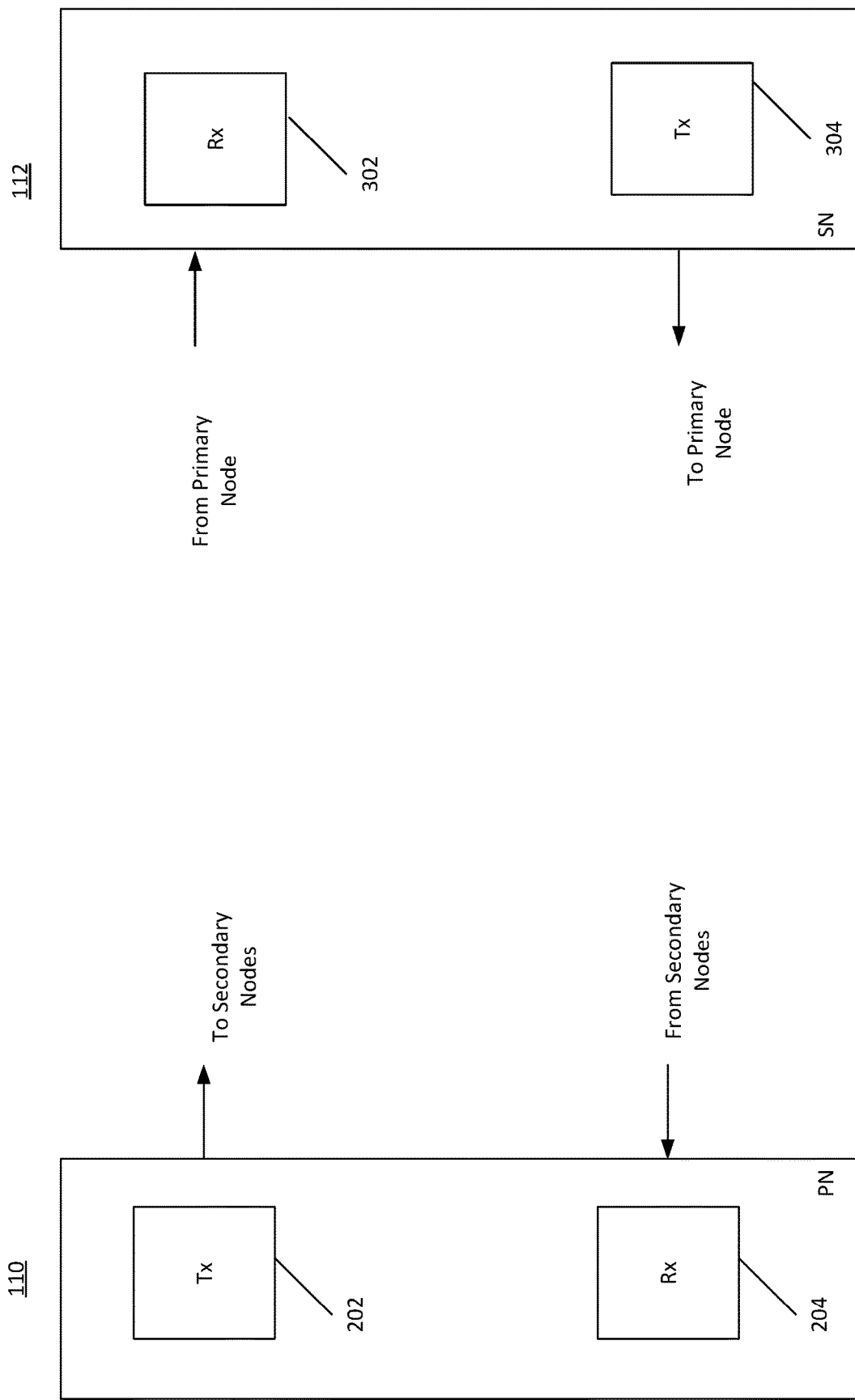

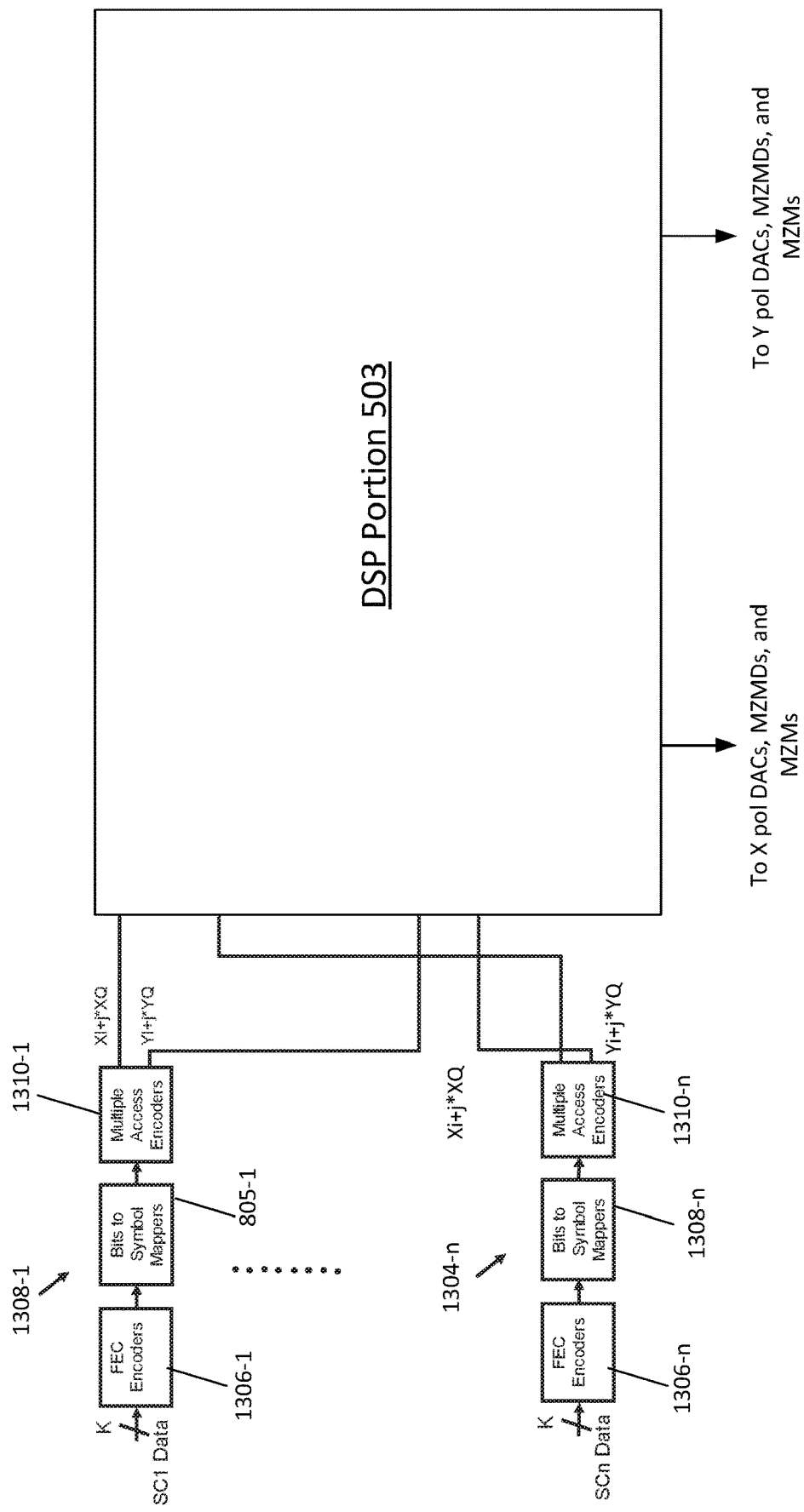

CODE DIVISION MULTIPLE ACCESS OPTICAL SUBCARRIERS

This application claims priority under 35 U.S.C. § 119 to U.S. Provisional Patent Application No. 62/813,151, filed on Mar. 4, 2019, the entire content of which is incorporated by reference herein in its entirety.

BACKGROUND

Optical communication systems are known in which multiple optical signals, each having a corresponding wavelength, and each being modulated to carry a different data stream, are multiplexed onto an optical fiber. In such systems, a laser and a modulator may be used to generate each optical signal. Accordingly, in order to increase the capacity of such systems, additional lasers, modulators and associated circuitry are employed. The cost associated with such systems may therefore increase, as capacity is increased. Accordingly, there is a need for a more cost-effective network requiring fewer components, such as the components described above.

Moreover, conventional optical communication systems may include high speed circuitry and components to generate optical signals at a transmit end of the system. Such signals may carry data at a relatively high data rate. At a receive end, corresponding high-speed circuitry may be provided to detect the incoming data and forward or distribute such data to lower capacity nodes. Accordingly, there is a further need to reduce costs by supplying high capacity signals to less expensive lower capacity nodes without the need for intermediate high-speed circuitry and components at the receive end of the system.

In addition, in conventional optical communication systems, data may be transmitted as a series of frames, each of which including a payload portion including customer or user data, and a header or overhead portion including operation, administration, and maintenance ("OAM") information associated with the system. With increasing network complexity, the amount of such control or OAM information has increased, which may limit the amount of transmitted customer data. Therefore, there is also need to more efficiently transmit the OAM information so that more customer data may be transmitted.

It is to be understood that both the foregoing general description and the following detailed description are exemplary and explanatory only and are not restrictive of the invention, as claimed.

The accompanying drawings, which are incorporated in and constitute a part of this specification, illustrate several embodiments and together with the description, serve to explain the principles of the present disclosure.

BRIEF DESCRIPTION OF THE DRAWINGS

FIGS. 2 and 3 show block diagrams of a primary node and secondary node, respectively, in accordance with an additional aspect of the present disclosure;

FIG. 9 shows an example of a primary node transmitter DSP consistent with an additional aspect of the present disclosure;

DESCRIPTION OF THE EMBODIMENTS

Consistent the present disclosure, a network or system is provided in which a hub or primary node may communicate with a plurality of leaf or secondary nodes. The hub node may operate or have a capacity that may be greater than that of the leaf nodes. Accordingly, relatively inexpensive leaf nodes may be deployed that receive data carrying optical signals from and supply data carrying optical signals to the hub node. One or more connections may couple each leaf node to the hub node, whereby each connection may include one or more spans or segments of optical fibers, optical amplifiers, and optical add/drop multiplexer, for example. Consistent with an aspect of the present disclosure, optical subcarriers may be transmitted over such connections. The subcarriers may be generated by a combination of a laser and a modulator, such that multiple lasers and modulators are not required, and costs may be reduced. In addition, the subcarriers may be employed using multiple access techniques, such as frequency division multiplexing (FDM), code-division multiple access (CDMA), and time-division multiple access (TDMA) so that the primary node can communicate with a relatively large number of secondary nodes. In addition, an out-of-band control channel may be provided to carry OAM information from the primary node to the secondary nodes, as well as from the secondary nodes to the primary nodes.

Reference will now be made in detail to the present embodiments of the present disclosure, examples of which are illustrated in the accompanying drawings. Wherever possible, the same reference numbers will be used throughout the drawings to refer to the same or like parts.

Figure 1A:
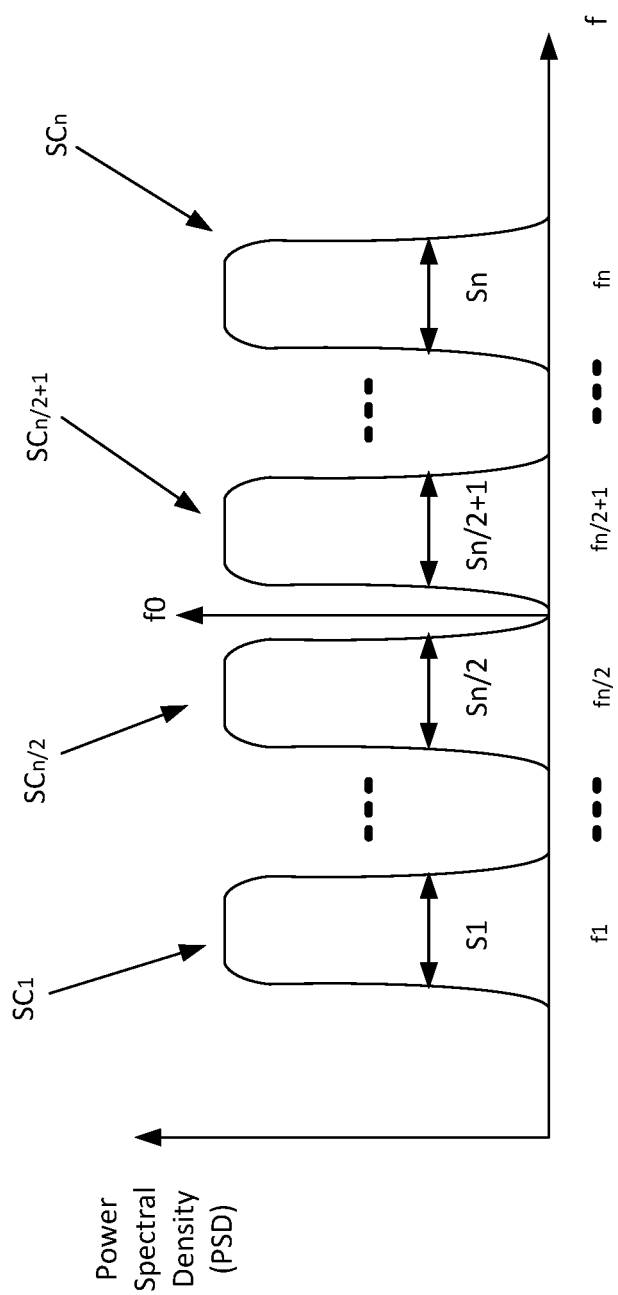
FIG. 1a illustrates a spectral plot showing optical subcarriers consistent with an aspect of the present disclosure.

FIG. 1a illustrates a plot 100 of power spectral density (PSD) vs. frequency consistent with the present disclosure. Plot 100 identifies a plurality of subcarriers SC1 to SCn, which may be supplied or output by a transmitter described in greater detail below. Each of subcarriers SC1 to SCn may have a corresponding one of a plurality of frequencies f1 to fn, as well as a respective one of spectral widths W1 to Wn In one example, half of the subcarriers, SC1 to SCn/2 have corresponding frequencies f1 to fn/2, which are less than a frequency f0 of a laser provided in the transmitter, and half of the subcarriers, SCn/2+1 to SCn have corresponding frequencies fn/2+1 to fn greater than f0.

Subcarriers SC1 to SCn, in one example, are Nyquist subcarriers, which are a group of optical signals, each carrying data, wherein (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the minimum Nyquist bandwidth, as determined by the baud rate of such subcarrier or the chip rate of the spreading signal if CDMA is further used within such a subcarrier.

Figure 1B:
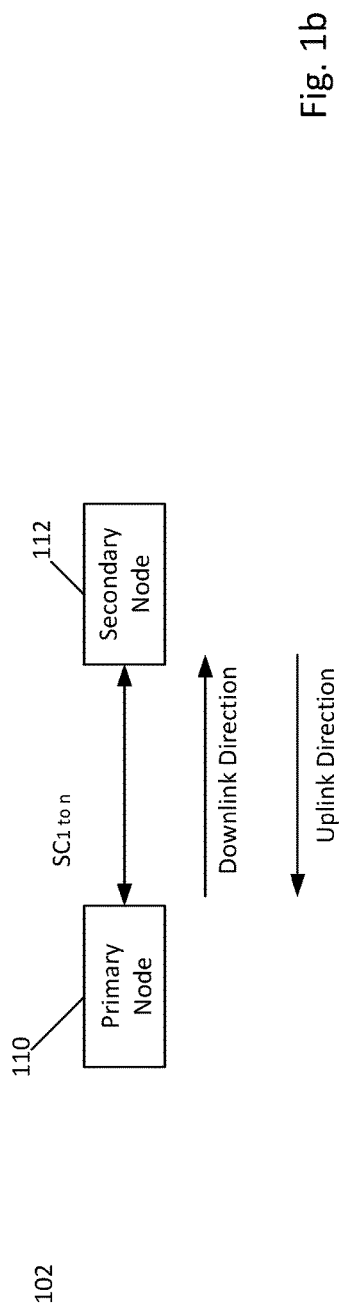
FIGS. 1b to 1d show block diagrams of networks consistent with an additional aspect of the present disclosure.
Figure 1C:
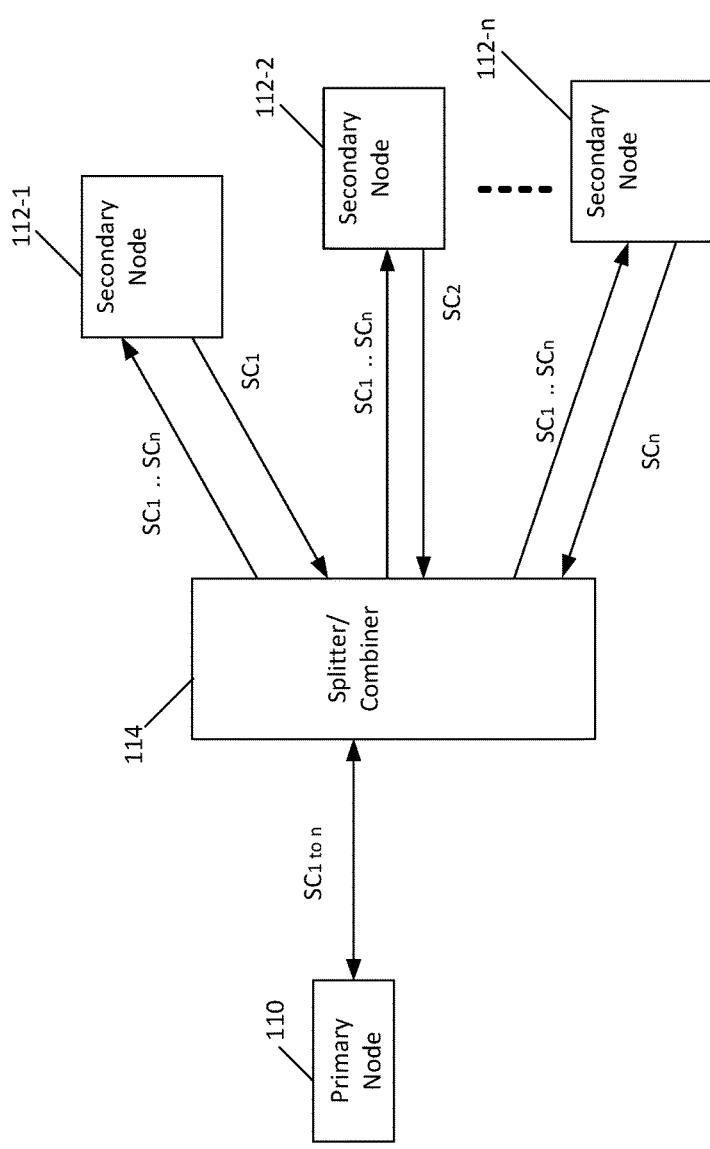
Figure 1D:
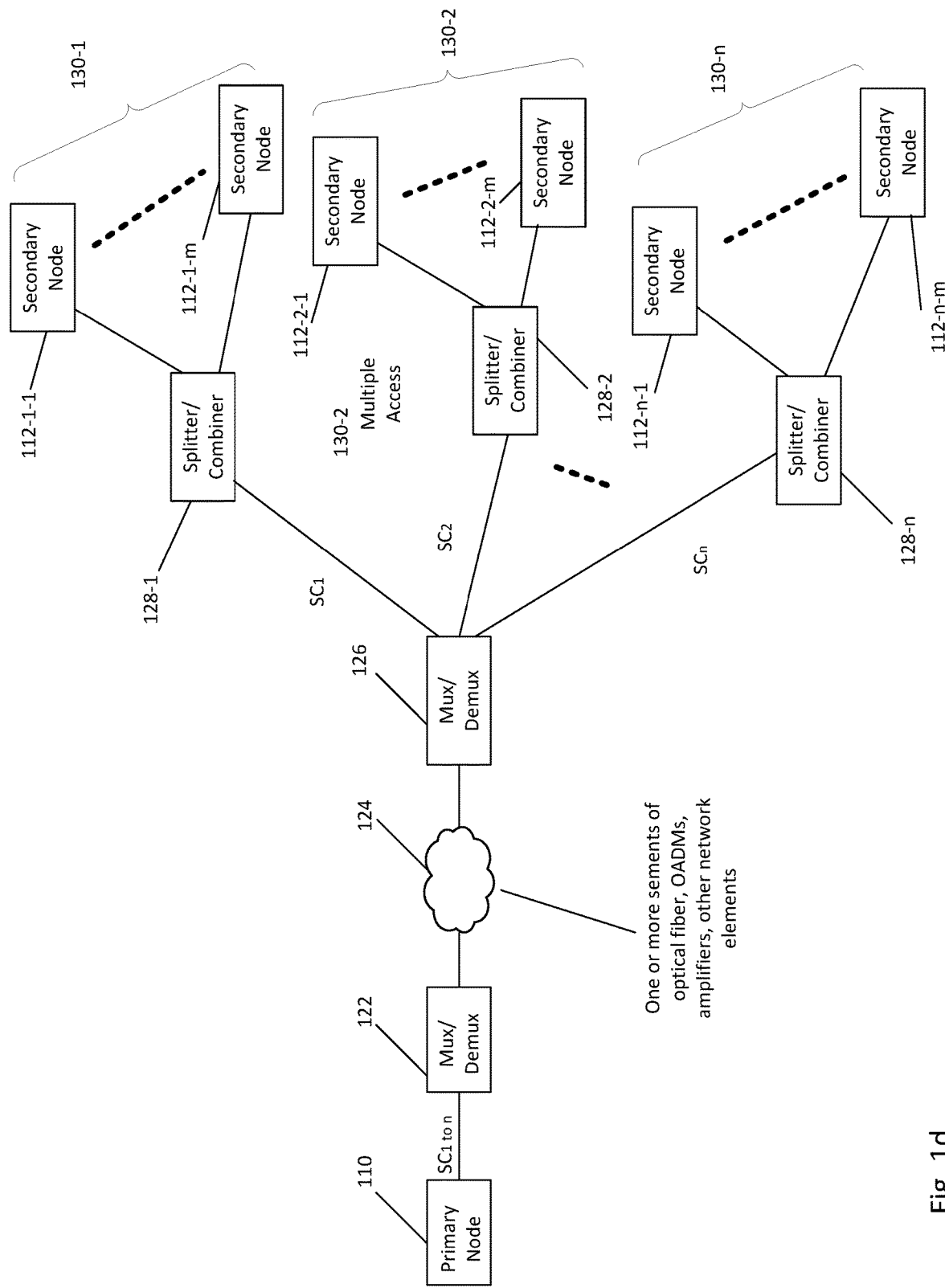

FIGS. 1b-1d illustrate examples of communication systems consistent with the present disclosure in which subcarriers SC1 to SCn may be transmitted.

FIG. 1b shows an example of connection 102, including an optical fiber link, between primary node 110 and secondary node 112. In one example, a modulated optical signal including subcarriers SC1 to SCn may be output from primary node 110 to secondary node 112 along an optical fiber link in a downlink direction. Further optical signals may be transmitted in an uplink direction from secondary node 112 to primary node 110 on the same fiber link of connection 102.

FIG. 1c shows an example of system 103 or aggregation network in which primary node 110 may communicate with multiple secondary nodes 112-1 to 112-n. System 103 may employ frequency division multiplexing (FDM) in which a modulated optical signal including subcarriers SC1 to SCn is output from primary node 110 to a multiplexer/demultiplexer (mux/demux) 114, which, in turn, supplies each subcarrier in a downlink direction to a respective on of secondary nodes 112-1 to 112-n. In addition, each of secondary nodes 112-1 to 112-n may supply a respective one of subcarriers SC1 to SCn to mux/demux 114 in an uplink direction. Mux/demux 114 may, in turn, provide a multiplexed output including the combined subcarriers SC1 to SCn to primary node 110.

Alternatively, mux/demux 114 may include a splitter/combiner to provide a power split portion of each of subcarriers SC1 to SCn may be supplied to a respective one of secondary nodes 112-1 to 112-n, and subcarriers SC1 to SCn output from secondary nodes 112-1 to 112-n may be combined by the splitter/combiner and output to primary node 110.

In addition to or in combination with FDM, multiple access techniques, such as code division multiple access (CDMA) or time division multiple access (TDMA) techniques, may be employed so that data or user data intended for a particular one of secondary nodes 112-1 to 112-n may be detected at such node and output to a user. Such multiple access techniques are described in greater detail below.

FIG. 1d shows an example of an aggregation network 120, in which primary node 110 supplies a modulated optical signal including subcarriers SC1 to SCn. In this example, subcarriers SC1 to SCn may be provided to a mux/demux 122, which may combine such subcarriers with other subcarriers. Subcarriers SC1 to SCn may then be directed through one or more segments of optical fiber, optical add-drop multiplexers, amplifiers, or other network elements, collectively, network elements 124, to a further mux/demux 126 which may separate or demultiplex subcarriers SC1 to SCn and direct or supply each subcarrier to a respective one of splitters/combiners 128-1 to 128-n. Each splitter/combiner 128-1 to 128-n further supplies power split portions of a corresponding one of subcarriers SC1 to SCn to a respective secondary node group 130-1 to 130-n, each of which including m secondary nodes (112-1-1 to 112-1-m; 112-2-1 to 112-2-m; ... 112-n-1 to 112-n-m), where n and m are integers. In one example, multiple access techniques, as discussed below, may be employed to direct data carried by a particular one of subcarriers SC1 to SCn from primary node 110 to desired secondary nodes or a node group. Further, such techniques may be employed in both uplink and downlink directions.

FIG. 2 illustrates primary node 110 in greater detail. Primary node 110 may include a transmitter 202 that supplies a modulated optical signal including subcarriers SC1 to SCn, and a receiver that 204 that may receive another modulated optical signal including such subcarriers, but carrying data or user data originating from the secondary nodes, such as node 112-1 to 112-n.

FIG. 3 shows a block diagram of one of secondary nodes 112, which may include a receiver circuit 302 that receives one or more of the subcarriers, such as subcarrier SC1, and transmitter circuit 304 that supplies a modulated optical signal including such subcarrier.

Figure 4:
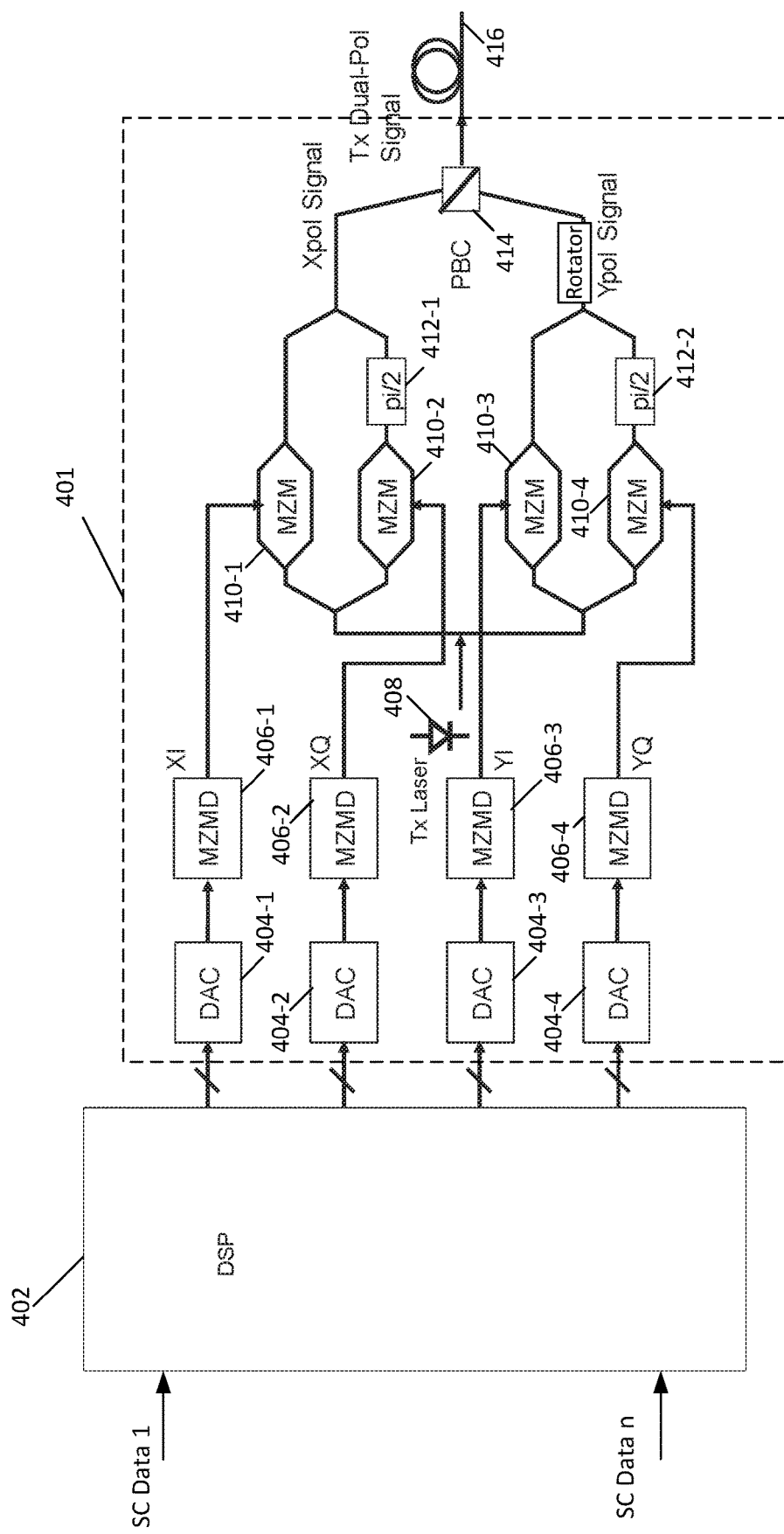
FIG. 4 shows an example of a primary node transmitter consistent with the present disclosure.

FIG. 4 illustrates transmitter 202 of primary node 110 in greater detail. Transmitter 202 include a digital signal processor (DSP) 402 (described in greater detail below), which may receive input data or data streams SC Data 1 to SC Data n. Based on these data streams, DSP 402 may supply a plurality of outputs to D/A and optics block 401 including digital-to-analog conversion (DAC) circuits 404-1 to 404-2, which convert digital signal received from DSP 402 into corresponding analog signals. D/A and optics block 401 also includes driver circuits 406-1 to 406-2 that receive the analog signals from DACs 404-1 to 404-4 adjust the voltages or other characteristics thereof to provide drive signals to a corresponding one of modulators 410-1 to 410-4.

D/A and optics block 401 further includes modulators 410-1 to 410-4, each of which may be a Mach-Zehnder modulator (MZM) that modulates the phase and/or amplitude of the light output from laser 408 having a frequency f0. As further shown in FIG. 4, light output from laser 408, also included in block, 401, is split such that a first portion of the light is supplied to a first MZM pairing including MZMs 410-1 and 410-2 and a second portion of the light is supplied to a second MZM pairing including MZMs 410-3 and 410-4. The first portion of the light is further split into third and fourth portions, such that the third portion is modulated by MZM 410-1 to provide an in-phase (I) component of an X (or TE) polarization component of a modulated optical signal, and the fourth portion is modulated by MZM 410-2 and fed to phase shifter 412-1 to shift the phase of such light by 90 degrees in order to provide a quadrature (Q) component of the X polarization component of the modulated optical signal. Similarly, the second portion of the light is further split into fifth and sixth portions, such that the fifth portion is modulated by MZM 410-3 to provide an I component of a Y (or TM) polarization component of the modulated optical signal, and the sixth portion is modulated by MZM 410-4 and fed to phase shifter 412-2 to shift the phase of such light by 90 degrees to provide a Q component of the Y polarization component of the modulated optical signal.

The optical outputs of MZMs 410-1 and 410-2 are combined to provide an X polarized optical signal including I and Q components and fed to a polarization beam combiner (PBC) 414 provided in block 401. In addition, the outputs of MZMs 410-3 and 410-4 are combined to provide an optical signal that is fed to a polarization rotator, further provided in block 401, that rotates the polarization of such optical signal to provide a modulated optical signal having a Y (or TM) polarization. The Y polarized modulated optical signal is also provided to PBC 414, which combines the X and Y polarized modulated optical signals to provide a polarization multiplexed ("dual-pol") modulated optical signal onto optical fiber 416, for example. In the examples disclosed herein, MZMs 410-1 to 410-4 collectively constitute a modulator.

The polarization multiplexed optical signal output from D/A and optics block 401 includes subcarriers SC1 to SCn noted above, such that each subcarrier has X and Y polarization components and I and Q components. Moreover, each subcarrier SC1 to SCn may be associated with or corresponds to a respective one of data streams SC Data 1 to SC Data n.

Figure 5:
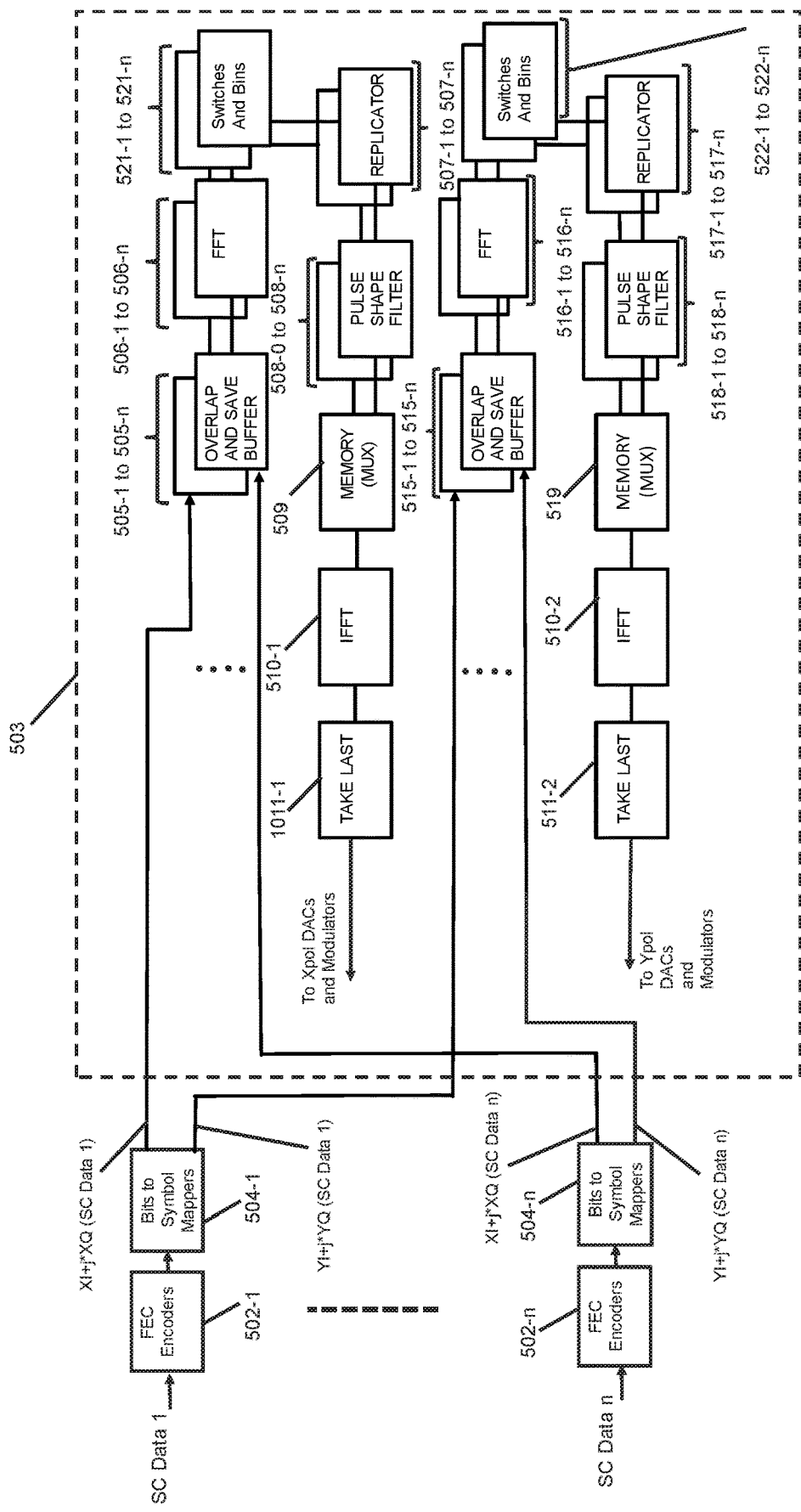
FIG. 5 shows an example of a block diagram of a transmitter DSP consistent with a further aspect of the present disclosure.

FIG. 5 shows an example of a DSP 402 in greater detail. As shown in FIG. 5, TX DSP 402 may include FEC encoders 502-1 to 502-n, each of which may receive a respective one of a plurality of independent input data streams of bits (SC Data 1 to SC Data n from a respective one of a plurality of data sources and carry out error correction coding on a corresponding one of the input data streams, such as through the addition of parity bits. FEC encoders 502-1 to 502-n may provide timing skew between the subcarriers to correct for skew induced by link between nodes 110 and 112-1 to 112-n described above.

Each of FEC encoders 502-1 to 502-n provides an output to a corresponding one of a plurality of bits-to-symbol circuits, 504-1 to 504-n (collectively referred to herein as "504"). Each of bits to symbol circuits 504 may map the encoded bits to symbols on a complex plane. For example, bits to symbol circuits 504 may map four bits to a symbol in a dual-polarization QPSK constellation. Each of bits to symbol circuits 504 provides first symbols, having the complex representation XI+j*XQ, associated with SC Data 1 to DSP portion 503. Data indicative of such first symbols is carried by the X polarization component of the polarization multiplexed modulated optical signal.

Each of bits to symbol circuits 504 may further provide second symbols to DSP portion 503. Such second symbols have the complex representation YI+j*YQ, also associated with SC Data 1. Data indicative of such second symbols, however, is carried by the Y polarization component of the polarization multiplexed modulated optical signal.

As further shown in FIG. 5, each of the first symbols output from each of bits to symbol circuits 504 is supplied to a respective one of first overlap and save buffers 505-1 to 505-n (collectively referred to herein as overlap and save buffers 505) that may buffer 256 symbols, for example. Each of overlap and save buffers 505 may receive 128 of the first symbols or another number of such symbols at a time from a corresponding one of bits to symbol circuits 504. Thus, overlap and save buffers 505 may combine 128 new symbols from bits to symbol circuits 505, with the previous 128 symbols received from bits to symbol circuits 505.

Each overlap and save buffer 505 supplies an output, which is in the time domain, to a corresponding one of fast Fourier Transform (FFT) circuits 506-1 to 506-n (collectively referred to as "FFTs 506"). In one example, the output includes 256 symbols or another number of symbols. Each of FFTs 506 converts the received symbols to the frequency domain using, for example, a fast Fourier transform. Each of FFTs 506 may include 256 memories or registers, also referred to as frequency bins, that store frequency components associated with the input symbols. Each of replicator components 507-1 to 507-n may replicate the 256 frequency components associated with of FFTs 506 and store such components in 512 or another number of frequency bins (e.g., for T/2 based filtering of the subcarrier) in a respective one of the plurality of replicator components. This replication may increase the sample rate.

Each of pulse shape filter circuits 508-1 to 508-n may apply a pulse shaping filter to the data stored in the 512 frequency bins of a respective one of the plurality of replicator components 507-1 to 507-n to thereby provide a respective one of a plurality of filtered outputs, which are multiplexed and subject to an inverse FFT, as described below. The pulse shape filter circuits 508-1 to 508-n calculate the transitions between the symbols and the desired spectrum so that the subcarriers can be packed together on the channel, e.g., with a close frequency separation. Pulse shape filter circuits 508-1 to 508-n may also be used to introduce timing skew between the subcarriers to correct for timing skew induced by links between nodes shown in FIGS. 1b-1c, for example. Multiplexer component 509, which may include a multiplexer circuit or memory, may receive the filtered outputs from pulse shape filter circuits 508-1 to 508-n, and multiplex or combine such outputs together to form an element vector.

Next, IFFT circuit or component 510-1 may receive the element vector and provide a corresponding time domain signal or data based on an inverse fast Fourier transform (IFFT). In one example, the time domain signal may have a same rate of 64 GSample/s. Take last buffer or memory circuit 511-1 may select the last 1024 or another number of samples from IFFT component 510-1 and output the samples to DACs 404-1 and 404-1 at 64 GSample/s, for example. As noted above, DAC 404-1 is associated with the in-phase (I) component of the X pol signal and DAC 404-2 is associated with the quadrature (Q) component of the Y pol signal. Accordingly, consistent with the complex representation XI+jXQ, DAC 404-1 receives values associated with XI and DAC 404-2 receives values associated with jXQ. Based on these inputs DACs 404-1 and 404-2 provide analog outputs to MZMD 406-1 and MZMD 406-2, respectively, as discussed above.

As further shown in FIG. 5, each of bits to symbol circuits 504-1 to 504-n outputs a corresponding one of symbols indicative of data carried by the Y polarization component of the polarization multiplexed optical signal output on fiber 416. As further noted above, these symbols may have the complex representation YI+j*YQ. Each such symbol may be processed by a respective one of overlap and save buffers 515-1 to 515-n, a respective one of FFT circuits 516-1 to 516-n, a respective one of replicator components or circuits 517-1 to 517-n, pulse shape filter circuits 518-1 to 518-n, multiplexer or memory 519, IFFT 510-2, and take last buffer or memory circuit 511-2, to provide processed symbols having the representation YI+j*YQ in a manner similar to or the same as that discussed above in generating processed symbols XI+j*XQ output from take last circuit 511-1. In addition, symbol components YI and YQ are provided to DACs 404-3 and 404-4, respectively. Based on these inputs, DACs 404-3 and 404-4 provide analog outputs to MZMD 406-3 and MZMD 406-4, respectively, as discussed above.

While FIG. 5 shows DSP 402 as including a particular quantity and arrangement of functional components, in some implementations, DSP 402 may include additional functional components, fewer functional components, different functional components, or differently arranged functional components.

As noted above, based on the outputs of MZMDs 406-1 to 406-4, a plurality of optical subcarriers SC1 to SCn may be output onto optical fiber 416, which is coupled to the primary node 110. Optical subcarriers SC1 to SCn may be provided to one or more of secondary nodes 112 in FIGS. 1b-1d and 2. An example of receiver circuit 302 in one of secondary nodes 112 will next be described with reference to FIG. 6.

Figure 6:
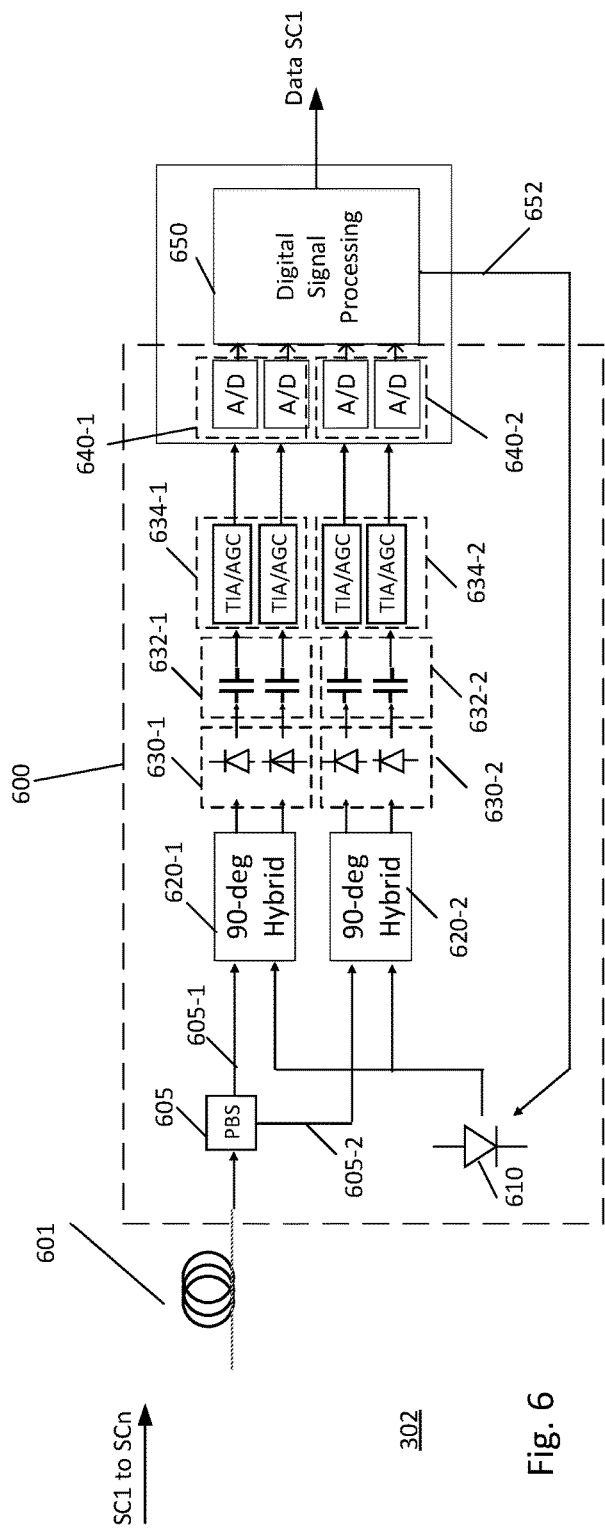
FIG. 6 shows an example of a secondary node receiver consistent with the present disclosure.

As shown in FIG. 6, optical receiver 302 may include an Rx optics and A/D block 600, which, in conjunction with DSP 650, may carry out coherent detection. Block 600 may include a polarization splitter 605 with first (605-1) and second (605-2) outputs), a local oscillator laser 610, 90 degree optical hybrids or mixers 620-1 and 620-2 (referred to generally as hybrid mixers 620 and individually as hybrid mixer 620), detectors 630-1 and 630-2 (referred to generally as detectors 630 and individually as detector 630, each including either a single photodiode or balanced photodiode), AC coupling capacitors 632-1 and 632-2, transimpedance amplifiers/automatic gain control circuits TIA/AGC 634-1 and 634-2, ADCs 640-1 and 640-2 (referred to generally as ADCs 640 and individually as ADC 640), and an RX DSP 650. Local oscillator 610, hybrid mixers 620, detectors 630, ADCs 640, and RX DSP 650 may correspond to like components described with regard to FIG. 6.

Polarization beam splitter (PBS) 605 may include a polarization splitter that receives an input polarization multiplexed optical signal including optical subcarriers SC1 to SCn and supplied by optical fiber link 601, which may include optical fiber 416 noted above. PBS 605 may split the incoming optical signal into the two X and Y orthogonal polarization components. Hybrid mixers 620 may combine the X and Y polarization components with light from local oscillator laser 610. For example, hybrid mixer 620-1 may combine a first polarization signal (e.g., the component of the incoming optical signal having a first or X (TE) polarization output from PBS port 605-1) with light from local oscillator 610, and hybrid mixer 620-2 may combine a second polarization signal (e.g., the component of the incoming optical signal having a second or Y (TM) polarization output from PBS port 605-2) with the light from local oscillator 610. In one example, a polarization rotator may be provided at PBS output 605-2 to rotate Y component polarization to have the X polarization.

Detectors 630 may detect mixing products output from the optical hybrids, to form corresponding voltage signals, which are subject to AC coupling by capacitors 632-1 and 632-1, as well as amplification and gain control by TIA/AGCs 634-1 and 634-2. The outputs of TIA/AGCs 634-1 and 634-2 and ADCs 640 may convert the voltage signals to digital samples. For example, two detectors or photodiodes 630-1 may detect the X polarization signals to form the corresponding voltage signals, and a corresponding two ADCs 640-1 may convert the voltage signals to digital samples for the first polarization signals after amplification, gain control and AC coupling. Similarly, two detectors 630-2 may detect the rotated Y polarization signals to form the corresponding voltage signals, and a corresponding two ADCs 640-2 may convert the voltage signals to digital samples for the second polarization signals after amplification, gain control and AC coupling. RX DSP 650 may process the digital samples associated with the X and Y polarization components to output data associated with one of the subcarriers, for example, such as Data SC1 associated with, which may be outputted as output data carried by one of the subcarrier.

While FIG. 6 shows optical receiver 302 as including a particular quantity and arrangement of components, in some implementations, optical receiver 302 may include additional components, fewer components, different components, or differently arranged components. The quantity of detectors 630 and/or ADCs 640 may be selected to implement an optical receiver 302 that is capable of receiving a polarization diverse signal. In some instances, one of the components illustrated in FIG. 6 may carry out a function described herein as being carry outed by another one of the components illustrated in FIG. 6.

In one example, in order to select a particular subcarrier at a remote node, local oscillator 610 may be tuned to output light having a wavelength relatively close to the selected subcarrier wavelength to thereby cause a beating between the local oscillator light and the selected subcarrier. Such beating will either not occur or will be significantly attenuated for the other non-selected subcarriers so that data carried by the selected subcarrier is detect and processed by DSP 650. In the example shown in FIG. 6, appropriate tuning of the local oscillator wavelength enables selection of one of the subcarriers, e.g., SC1, carrying signals or data indicative of Data SC1, as discussed below. Accordingly, subcarriers may be effectively routed through network 100 to a desired receiver in a particular node.

Accordingly, at each node receiver, such as receiver 302, which may be included in nodes 10, 20, 30, and 40, the local oscillator laser, e.g., 610, may be tuned to have a wavelength close to that of one of the subcarrier carrying signals and data indicative of the desired client data to be output from the DSP, e.g., DSP 650. Such tuning may be achieved by adjusting a temperature or current flowing through local oscillator 610, which may include a semiconductor laser, such as a distributed feedback (DFB) laser or distributed Bragg reflector (DBR) laser. Thus, different optical components in each receiver to select optical signals carrying a desired data stream are not required. Rather, as noted above, the same or substantially the same circuitry may be proved in the receiver portion of each node, such as a node in a mesh network, and signal or data selection may be achieved by tuning the local oscillator laser to the desired beating wavelength.

As further shown in FIG. 6, DSP 650 may have an output 652, such that based on such output, the temperature of or the current supplied to local oscillator laser 610 may be controlled. In the case of temperature control, a thin film heater may be provided adjacent local oscillator laser 610, and an appropriate current may be supplied to such heater, based on output 652, to heat laser 610 to the desired temperature. Control circuitry in DSP 650 may generate output or control signal 652. Alternatively, such circuitry may be provided outside DSP 650. Additionally, the frequency of local oscillator laser 610 may be adjusted by varying the current supplied laser 610 based on control signal 652.

Figure 7:
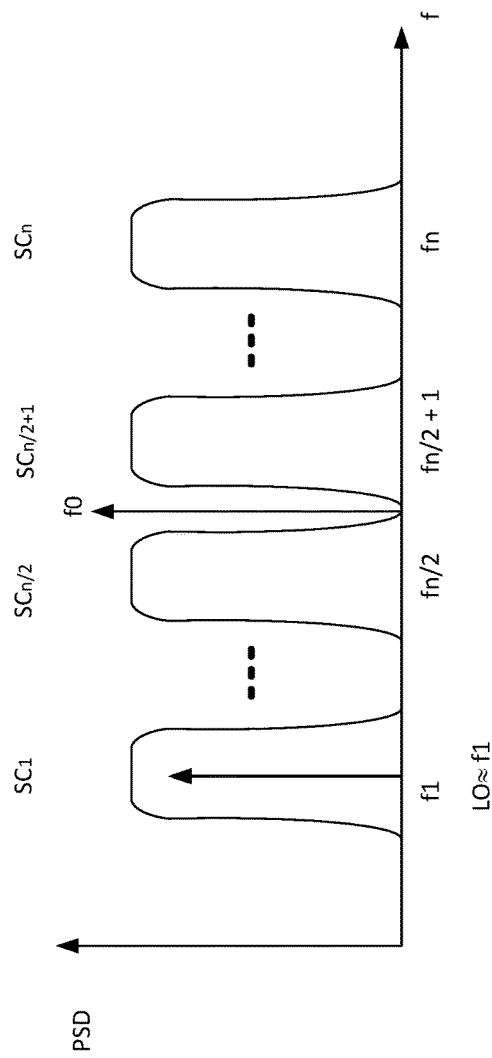
FIG. 7 shows a further example of an optical subcarrier spectral plot in which local oscillator light may be tuned to one of the subcarriers consistent with the present disclosure.

FIG. 7 shows an example in which the frequency of light output from local oscillator laser 610, fLO, may be tuned to frequency f1 so that Data SC1 associated with subcarrier SC1 is selected and output from DSP 650. By tuning fLO in a manner similar to that described above, fLO may, in one example, be adjusted to be substantially the same as, but not equal to, subcarrier frequency f1. As a result, the incoming optical subcarrier SC1 will beat with the light output from local oscillator 610 so that SC1 may be demodulated by optical hybrids 620-1 and 620-2 and processed as noted above to output Data SC1. In a similar manner, frequency fLO may be tuned to select data associated with or carried by the remaining subcarriers SC2 to SCn.

Figure 8:
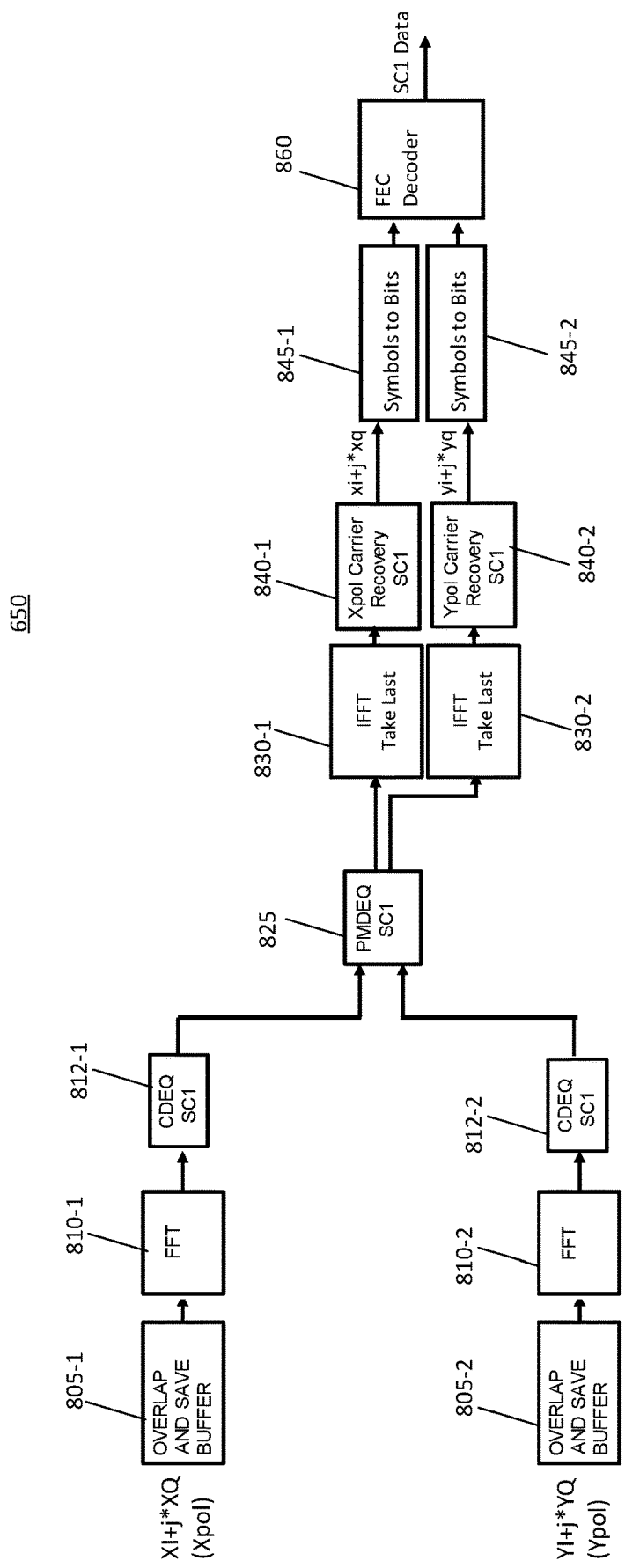
FIG. 8 shows an example of a secondary node receiver DSP consistent with the present disclosure.

FIG. 8 illustrates exemplary components of an example of the receiver digital signal processor (DSP) 650 shown in FIG. 6. The DSP 650 may include overlap and save buffers 805-1 and 805-2, FFT components or circuits 810-1 and 810-2, chromatic dispersion (CD) equalizer components (CDEQs) or circuits 812-1 and 812-2, polarization mode dispersion (PMD) equalizer components or circuit 825, IFFT components or circuits 830-1 and 830-2, carrier recovery components or circuits 840-1 and 840-2, symbols to bits components 845-1 and 845-2, and FEC decoder 860.

As noted above, analog-to-digital (A/D) circuits 640-1 output digital samples corresponding to the analog inputs supplied thereto. In one example, the samples may be supplied by each A/D circuit at a rate of 64 GSamples/s. The digital samples correspond to symbols carried by X polarization optical subcarrier SC1 and may be represented by the complex number XI+jXQ. The digital samples may be provided to overlap and save buffer 805-1-2. The FFT component 810-1 may receive the 2048 vector elements, for example, from the overlap and save buffer 805-1 and convert the vector elements to the frequency domain using, for example, a fast Fourier transform (FFT). The FFT component 810-1 may convert the 2048 vector elements to 2048 frequency components, each of which is stored in a register or "bin" or other memory, as a result of carry outing the FFT.

The frequency components are then supplied to CDEQ 812-1, which may include a finite impulse response (FIR) filter that corrects, offsets or reduces the effects of, or errors associated with chromatic dispersion of the transmitted optical subcarrier SC1, in this example. CDEQ 812-1 supplies an output to a polarization mode dispersion (PMD) equalizer circuit 825.

It is noted that digital samples output from A/D circuits 640-2 associated with Y polarization components of subcarrier SC1 may be processed in a similar manner to that of digital samples output from A/D circuits 640-1 and associated with the X polarization component of subcarrier SC1. Namely, overlap and save buffer 805-2, FFT 810-2 and CDEQ 812-2 may have the same or similar structure as and operate in the same or similar fashion as buffer 805-1, FFT 810-1 and CDEQ 812-1, respectively. For example, CDEQ 812-2 may include an FIR filter that corrects, offsets, or reduces the effects of, or errors associated with chromatic dispersion of the transmitted optical subcarrier SC1, in this example. Like, CDEQ 812-1, CDEQ 812-2 provide an output to PMDEQ 825.

PMD component 825 may include another FIR filter that corrects, offsets or reduces the effects of, or errors associated with PMD of the transmitted, subcarrier, such as subcarrier SC1. PMD component supplies a first output to IFFT component 830-1, which converts a 256 element vector, in this example, back to the time domain as 256 samples in accordance with, for example, an inverse fast Fourier transform (IFFT).

Time domain signals or data output from IFFT 830-1 are supplied to carrier recovery circuitry or component 840-1, which may apply carrier recovery techniques to compensate for transmitter (e.g., laser 408) and receiver (e.g., local oscillator laser 610) linewidths. In some implementations, the carrier recovery component 840-1 may carry out carrier recovery to compensate for frequency and/or phase differences between the transmit signal and the light from the local oscillator 610. After carrier recovery, the data associated with the X polarization component may be represented as symbols having the complex representation $xi+j*xq$ in a constellation, such as a QPSK constellation or a constellation associated with another modulation formation, such as an m-quadrature amplitude modulation (QAM), m being an integer. In some implementations, the output of carrier recovery component 840-1 may be used to update the taps of the FIR filter included in PMD component 825.

The symbols to bits component 845-1 may receive the symbols output from the carrier recovery component 840-1 and map the symbols back to bits. For example, the symbol to bits component 845-1 may map one symbol, in the QPSK constellation, to Z bits, where Z is an integer. For dual-polarization QPSK modulated subcarriers, X is four. Bits output from component 845-1 are provided to FEC decoder 860.

As noted above, PMD equalizer circuit 825 provides a second output. As further shown in FIG. 8, the second output is received by IFFT 830-2, which provides an output to carrier recovery component or circuitry 840-2. IFFT 830-2 and carrier recovery circuitry 840-2 may have the same or similar and operate in the same or similar fashion as IFFT 830-1 and carrier recovery circuitry 840-1, respectively, to provide symbols having the complex representation $yi+j*yq$ associated with data carried by the Y polarization component. Symbols output from carrier recovery circuit 840-2 may be provided to symbols to bit circuit or component 845-2 having the same or similar structure and operating in the same or similar manner as symbols to bits component 845-1 to output bits to FEC decoder 860.

In some implementations, FEC the bits may be decoded for error correction using, for example, FEC. The output bits component 850 may output 128*X bits at a time, for example. For dual-polarization QPSK, for example, the output bits component 850 may output 512 bits at a time, for example.

FEC decoder 860 may process the bits output from components 845-1 and 845-2 to remove errors using forward error correction. Such error corrected bits may be output as the SC1 Data.

While FIG. 6 shows DSP 650 as including a particular quantity and arrangement of functional components, in some implementations, DSP 650 may include additional functional components, fewer functional components, different functional components, or differently arranged functional components.

FIGS. 4-8 describe an example of FDM transmission from primary node 110 to one of secondary nodes 112 (see FIGS. 1b-1d, whereby each secondary node transmits and receives data over a particular subcarrier. Alternatively, multiple subcarriers may carry data one or more of such secondary nodes. In another example, each subcarrier may be encoded based on code division multiple access (CDMA) techniques to direct data for a particular secondary node within a group of secondary nodes.

CDMA subcarrier transmission from primary node 110 to secondary nodes 112 will next be described with reference to FIGS. 9-12. FIG. 9 shows a block diagram of DSP 1302 included in primary node transmitter 202 in place of DSP 402 in FIG. 4 to facilitate CDMA optical subcarrier transmission consistent with an aspect of the present disclosure. DSP 1302 is similar to DSP 402. For example, DSP 1302, like DSP 402, includes a DSP portion 503 that includes overlap and save buffers, FFT circuits, replicator circuits, pulse shape filters, a multiplexer, demultiplexer, IFFTs, and take last buffers. DSP 1302, however, includes input blocks 1304-1 to 1304-n (collectively referred to as input blocks 1304), each of which receiving a respective one of K data streams. Collectively, each group of K data streams may constitute a respective input data SC1 Data to SCn Data. As noted above, each of subcarriers SC1 to SCn may carry respective information indicative of a corresponding one of SC1 Data to SCn Data.

Each input block may receive a group of K data streams, which are input to a respective one of FEC encoder groups 1306-1 to 1306-n (collectively referred to herein as FEC encoder groups 1306). The outputs of each FEC encoder group 1306 are next supplied to a respective one of bits to symbol mapper groups 1308-1 to 1308-n, which, in turn, supply symbols to multiple access encoder circuits 1310-1 to 1310-n that further encode the received symbols based on CDMA. The symbols output from encoders 1310-1 to 1310-n are processed by DSP portion 503 in a manner similar to that described above with reference to FIG. 4.

Multiple access encoders 1310 may encode the symbols output from mappers 1308 to provide CDMA or TDMA. CDMA encoding will next be described with reference to FIGS. 10a and 10b, which shows block 1304-1 in greater detail. It is understood that remaining input blocks 1304-2 to 1304-n have the same or similar structure and operation in the same or similar manner as input block 1304-1.

In one example, CDMA transmission may be asynchronous, as described below with reference to FIG. 10a. Alternatively, in another example, CDMA transmission, is synchronous, as described below with reference to FIG. 10b.

Figure 10A:
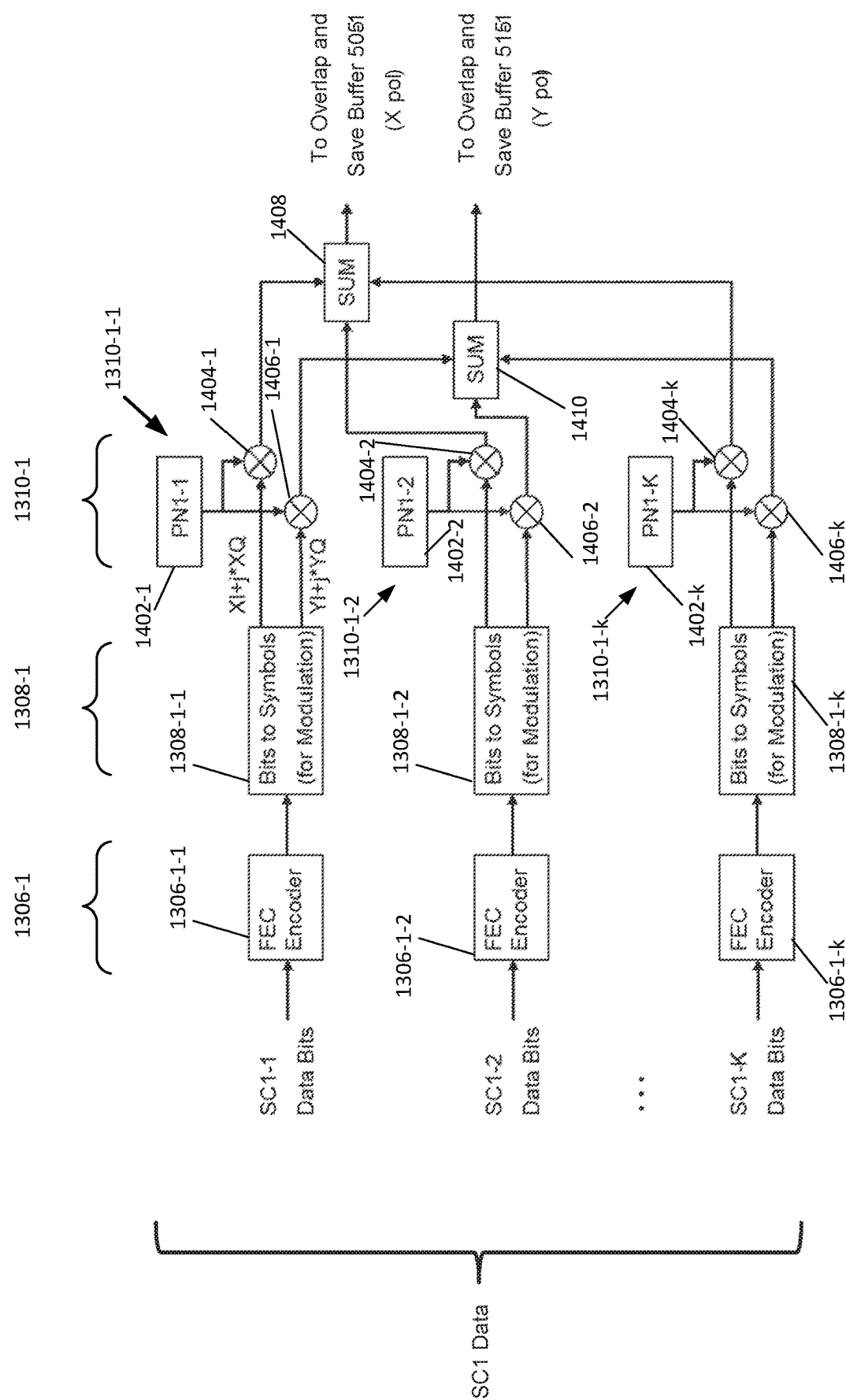
FIG. 10a shows an example of CDMA encoding in a primary node consistent with a further aspect of the present disclosure.

As shown in FIG. 10a, each of FEC encoders 1306-1 (shown as encoders 1306-1-1 to 1306-1-K) may receive a corresponding one of data streams SC1-1 Data Bits to SC1-K Data Bits and encode such data bits in accordance with an error correcting codes, as described above. The encoded data streams are next supplied to a respective one of bits to symbol circuits 1308-1-1 to 1308-1-K, which map the encoded bits to symbols, as further described above, the resulting symbols having the complex representations $XI+j*XQ$ (X symbols for X polarization) and $YI+j*YQ$ (Y symbols for Y polarization) are provided to CDMA encoding circuits 1310-1-1 to 1310-1-K.

Each of CDMA encoding circuits 1310-1-1 to 1310-1-K includes a respective one of code generator circuits 1402-1 to 1402-K, a respective one of first multiplier circuits 1404-1 to 1404-K, and a respective one of second multiplier circuits 1406-1 to 1406-K. Each of code generator circuits 1402-1 to 1402-K supplies a corresponding one of K orthogonal spreading codes, each of which may be, for example, a Gold code, a Maximum Length Pseudo Noise (PN) code, or other PN code to provide asynchronous CDMA transmission. Alternatively, any other orthogonal codes with good auto-correlation and low cross-correlation may be used. Typically, the spreading codes are binary signals (e.g., 1 or −1) with a chip rate higher than the symbol rate of the signal to be spread. The exact chip rate may be based on the processing gain required to accommodate the total number of secondary nodes 112 sharing the subcarrier bandwidth or capacity.

As further shown in FIG. 10a, in each encoder 1310-1, the X symbols are input to a corresponding multiplier circuit 1404, which multiplies the X symbol by a corresponding code, which is also supplied to multiplier circuit 1406, such that the Y symbol is multiplied by the same code. For example, each X symbol is input to a corresponding one of multiplier circuits 1404-1-1 to 1404-1-K, and each Y symbol is input to a corresponding one of multiplier circuits 1406-1-1 to 1406-1-K. Multiplier circuits 1404-1 to 1404-K multiply a respective X symbol by a code output from a respective one of code generator circuits 1402-1 to 1402-K. Similarly, multiplier circuits 1406-1 to 1406-K multiply a respective Y symbol by the code output from the corresponding one of code generator circuits 1402-1 to 1402-K. The resulting products output from multiplier circuits 1404-1 to 1404-K are added together by adder circuit 1408, and the resulting sum (CDMA encoded symbols also having the complex representation $XI+i*XQ$) is output to overlap and save buffer 505 of DSP portion 503 described above. In addition, the products output from multiplier circuits 1406-1 to 1406-K are added to one another by adder circuit 1410, and the resulting sum (CDMA encoded symbols (at the chip rate of the spreading code) also having the complex representation $YI+j*YQ$) is output to overlap and save buffer 515-1 of DSP portion 503.

In a similar fashion, encoders 1310 in each of remaining input blocks 1304 operate in the same or similar manner and have the same or similar structure to provide X and Y CDMA encoded signals to a respective one of overlap and save buffers 505-2 to 505-n (associated with the X polarization) and a respective one of overlap and save buffers 515-2 to 515-n (associated with the Y polarization).

Figure 10B:
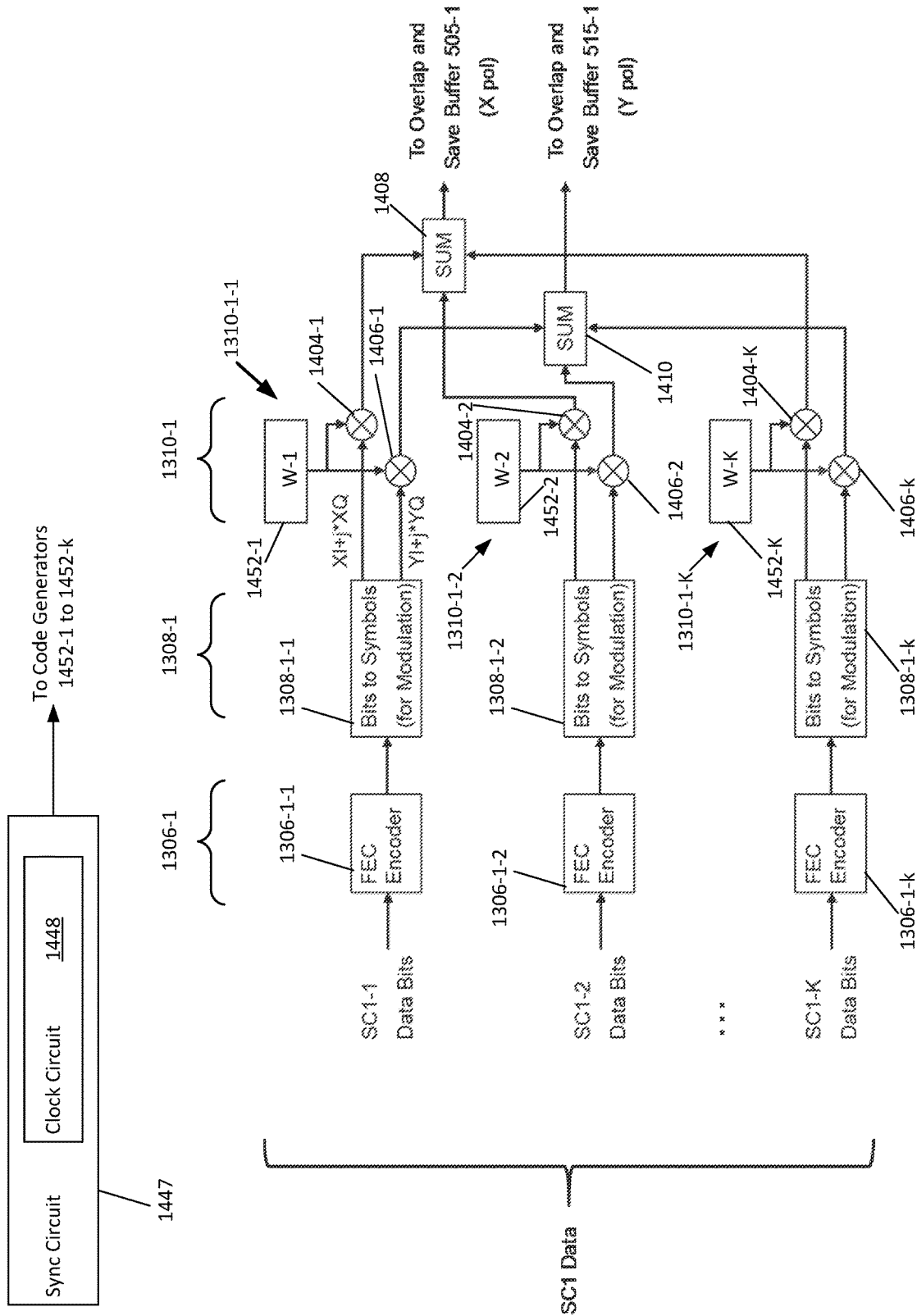
FIG. 10b shows an example of CDMA encoding in a primary node consistent with an additional aspect of the present disclosure.

The example shown in FIG. 10a provides asynchronous CDMA encoded signals. Consistent with a further aspect of the present disclosure, synchronous transmission may also be provided, as shown in FIG. 10b. Namely, the structure and operation of the circuitry shown in FIG. 10b is similar to that described in connection with FIG. 10a. In FIG. 10b, however, a synchronization circuit 1447, including, for example, a clock signal generator or clock circuit 1448, that adjusts the timing of the generation of each code. As a result, the scheduling of the beginning of each code may be defined. Based on such scheduling, each secondary node downstream from primary node 110 may identify the beginning of each code word for accurate decoding.

In the example shown in FIG. 10b, encoders 1452-1 to 1452-k generate Walsh codes, instead, the PN codes noted above.

Based on the outputs from summation or adder circuits 1408 and 1410 to the overlap and save buffers and the outputs of such buffers, DSP portion 503 generates processed symbols, and based on such symbols, DACs 404, drivers 406, and modulators 410 generate optical subcarriers, SC1 to SCn. The optical carriers, therefore, carry data indicative of the codes output from the code generator circuits 1402.

Figure 11:
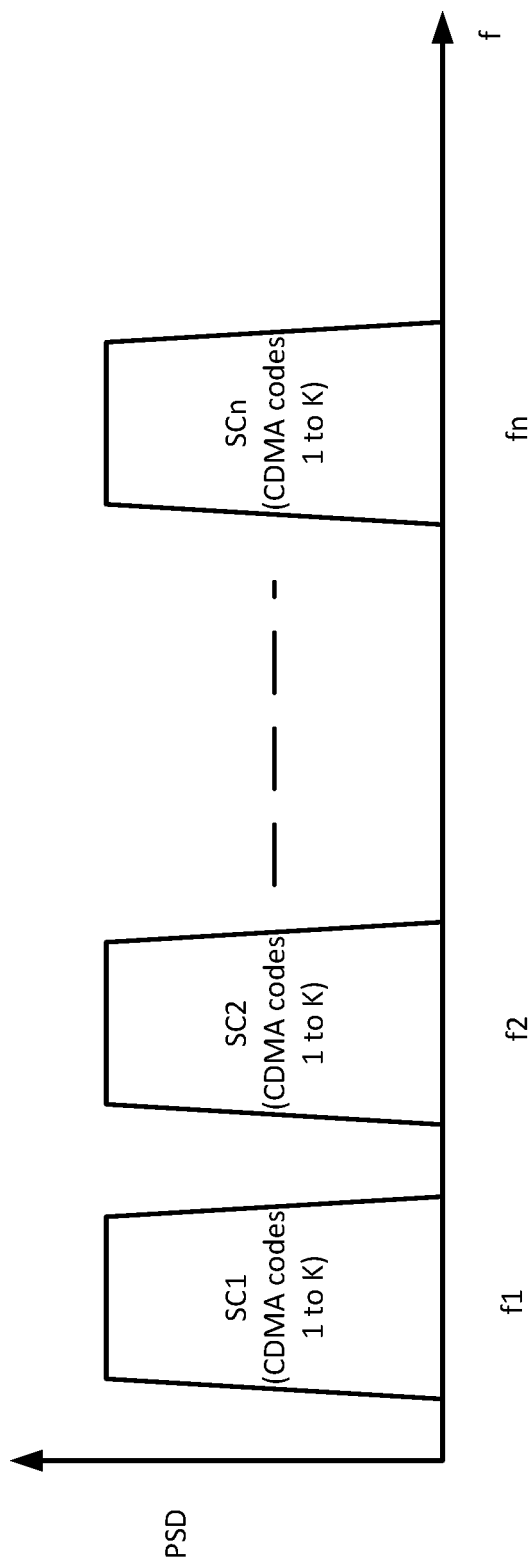
FIG. 11 illustrates a spectral plot of subcarriers carrying data indicative of CDMA codes consistent with an aspect of the present disclosure.

FIG. 11 shows plot 1500 of power spectral density (PSD) vs. frequency and shows each of subcarriers SC1 to SCn having a corresponding one of a plurality of frequencies. In addition, in this example, each of subcarriers SC1 to SCn carries data or information indicative of K codes, to thereby provide access or data detection by K secondary nodes 112 configure to receive or detect user data carried by a given subcarrier. In one example, each of K secondary nodes receives subcarrier SC1. In addition, the receiver (e.g., receiver 302) in each such K secondary nodes may apply CDMA decoding to detect the user data intended for that secondary node, as described in greater detail below.

As discussed above, one or more optical subcarriers may be supplied to receiver 302 of a secondary node 112. The structure and operation of receiver 302 is described above in connection FIG. 6. The subcarriers shown in FIG. 11 may be detected by receiver 302 in a manner similar to that described above in connection with FIGS. 6 and 8. That is, the optical signal subcarriers may be mixed with local oscillator light in optical hybrids 620, the resulting mixing products converted to electrical signal by photodiodes 630, and electrical signals output from the photodiodes may be capacitively coupled to TIA and AGC circuits 634. The analog outputs of the AGC circuits may then be converted to digital signals by A/D circuits 640 and supplied to DSP 650.

Figure 12:
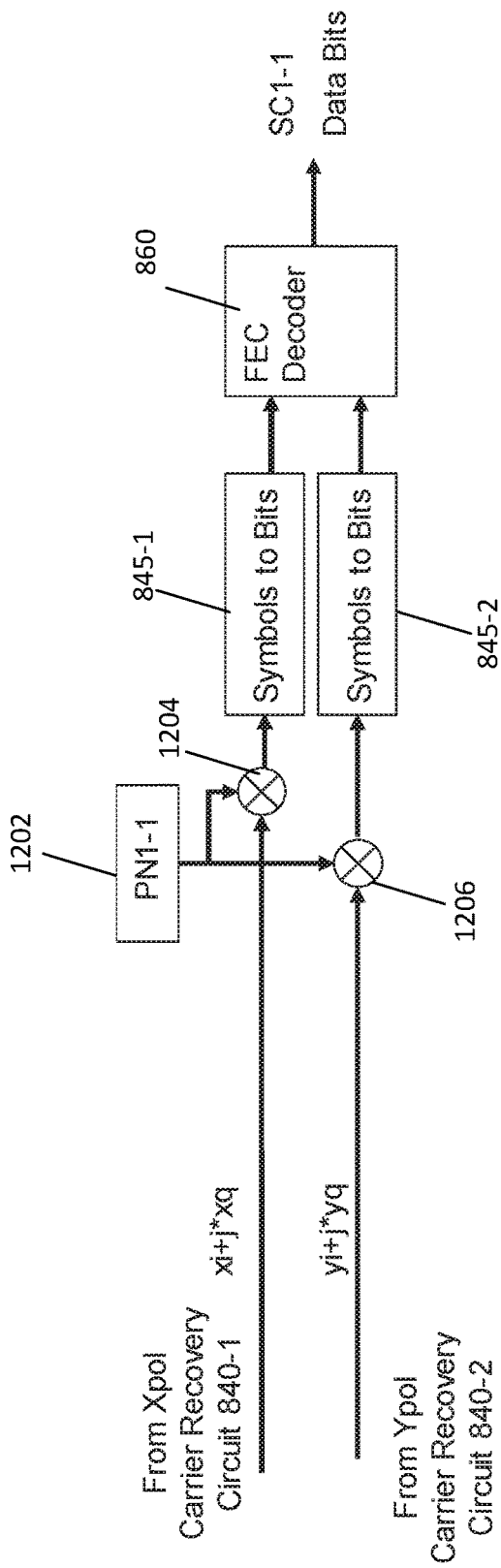
FIG. 12 shows an example of CDMA decoding in a secondary node consistent with a further aspect of the present disclosure.

Further processing in DSP 650 by circuits 805, 810, 812, 825, 830, and 840 is similar to that described above in connection with FIG. 8. As shown in FIG. 12, however, the first (xi+j*xq) and second (yi+j*yq) symbol outputs are supplied to multiplier circuits 120404 and 1206, respectively in DSP 650, in this example. The first symbols may be multiplied by a code output from code generator 1202, and the second symbols may also be multiplied by the code. Such multiplication decodes the received symbols so that data encoded in primary node 110 based on a code matching the code output from generator 1202 will be output from multiplier circuits 1204 and 1206 to symbol to bits circuits 845-1 and 845-2, respectively. Symbol to bits circuits 845, in turn, provide outputs to FEC decoder 860 to provide the user data SC1-1 in this example. Operation of circuits 845 and 860 is described above in connection with FIG. 8.

The circuitry shown in FIG. 12 may be provided in the receiver DSPs included in other secondary nodes 112 and may operate in the same manner as that described above to decode a respective one of user data streams carried by each subcarrier.

In the above example, synchronous or asynchronous CDMA transmission may be employed in the downlink direction.

As noted above in connection with FIG. 9, multiple access encoder may also encode symbols for TDMA transmission from primary node 110 to multiple secondary nodes 112, as well as from multiple secondary nodes 112 to primary node 110. Such TDMA transmission consistent with a further aspect of the present disclosure will next be described.

As noted above, control channel information may include coding information that is transmitted over the in-band or out-of-band control channel from the primary node 110 to the secondary nodes 112. In one example, n CDMA codes may be transmitted to n secondary nodes 112, whereby each of the n codes is assigned to a respective one of the secondary nodes 112, so that each secondary node may detect and decode data intended for such secondary node, as further noted above. Additional identification information may be transmitted with the CDMA codes so that each secondary node may store or detect a corresponding one of the CDMA codes for future data detection and decoding. As secondary nodes 112 are added or removed from the network the number of CDMA codes transmitted to the secondary node may change. In addition, the CDMA code supplied to a given secondary node may change over time.

Accordingly, as noted above, the number of secondary nodes 112 communicating with primary node 110 may vary, and control channel information may be exchanged between the primary node and the secondary nodes so that the current network configuration is communicated to all nodes. Thus, even though the number of secondary nodes 112 communicating with primary node 110 may change over time, each secondary node may continue to receive data its intended data and transmit data to primary node 110.

In the examples noted above, code-division multiple access techniques are employed so that a high capacity primary node 110 may supply subcarriers, each carrying data at a high data rate, e.g., 100 Gbit/s or 25 Gbit/s, for downstream communication with a plurality of lower rate receivers provided in secondary nodes 112.

Figure 13:
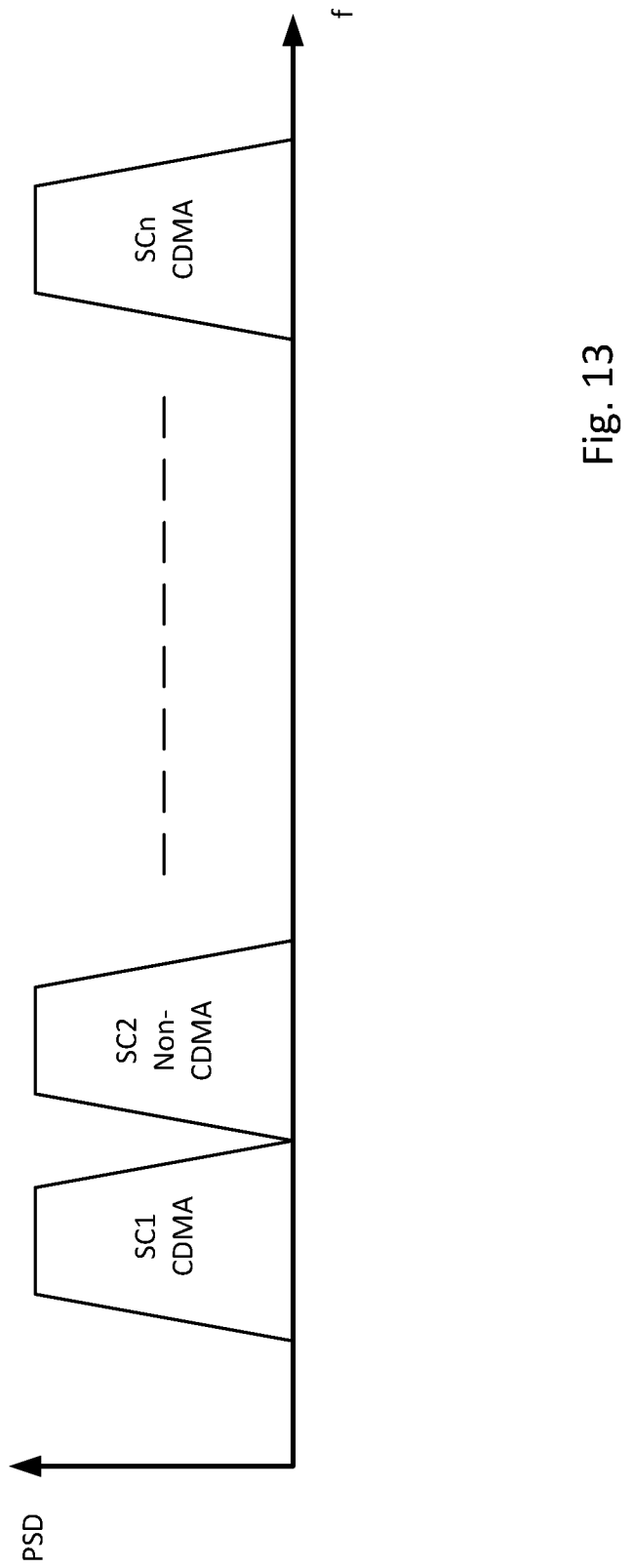
FIG. 13 shows a plot of power spectral density as a function of frequency consistent with an aspect of the present disclosure.

Consistent with a further aspect of the present disclosure, certain subcarriers, e.g., SC2 to SCn in FIG. 13, may carry CDMA encoded data while other subcarriers, e.g., SC2, do not. As a result, certain subcarriers may be employed for multiple access to carry different portion of an input data to the primary node transmit DSP, such as SC1-1 Data bits and SC1-2 Data bits, while the subcarrier carrying information that is not based on CDMA encoding provides a data optical signal that is received by a single secondary node 112, for example. An example of a portion (1400) of DSP 402 for providing both types of subcarriers is shown in FIG. 14.

DSP portion 1400 includes, for example, bits-to-symbol mapper 1308-1, which as described above, outputs symbols based on input data bits. When such symbols are not CDMA encoded, switches SW1 is configured, based on a control signal, for example, to bypass FEC encoder 1306-1-1, bits to symbol mapper 1308-1-1 and multiplier circuits 1404-1 and 1406-1, such that SC1-1 Data Bits are fed to FEC encoder 1460 instead. The output of FEC encoder 1460 is next provided to bits-to-symbol mapper circuit 1464, which outputs symbols XI+j*XQ (X symbol) and YI+j*YQ (Y symbol) associated with the X and Y polarization polarizations of a corresponding subcarrier, such as subcarrier SC1. The X symbols are next provided to switch SW2, which outputs the X symbols to X pol overlap and save buffers 505 for further processing, as noted above. In addition, the Y symbols are fed to switch SW3, which outputs the Y symbols to Y pol overlap and save buffers for further processing, as described above.

Figure 14:
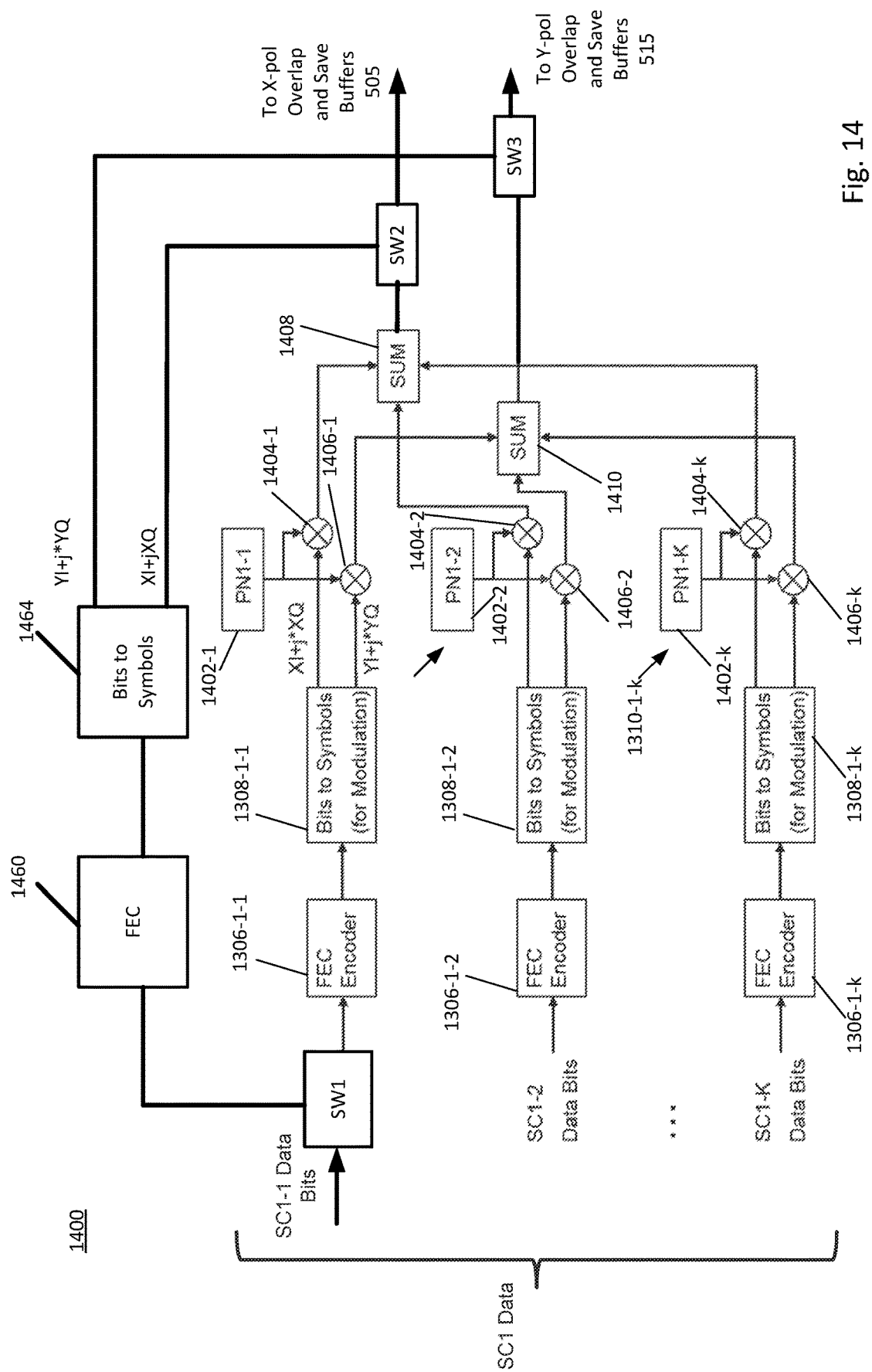
FIG. 14 shows an example of a portion of a DSP consistent with the present disclosure.

In the example shown in FIG. 14, if CDMA encoding is not desired, only data corresponding to the SC1-1 Data Bits may be transmitted to only one secondary node 112 and subcarrier SC1's does not also carry data intended for other secondary nodes.

If CDMA encoding is desired, switch SW1 is configured to supply the SC1-1 Data bits to FEC encoder 1306-1-1 and processing of such data bits as well as the SC1-2 to SC1-K data bits is carried about in the manner described above.

Figure 15:
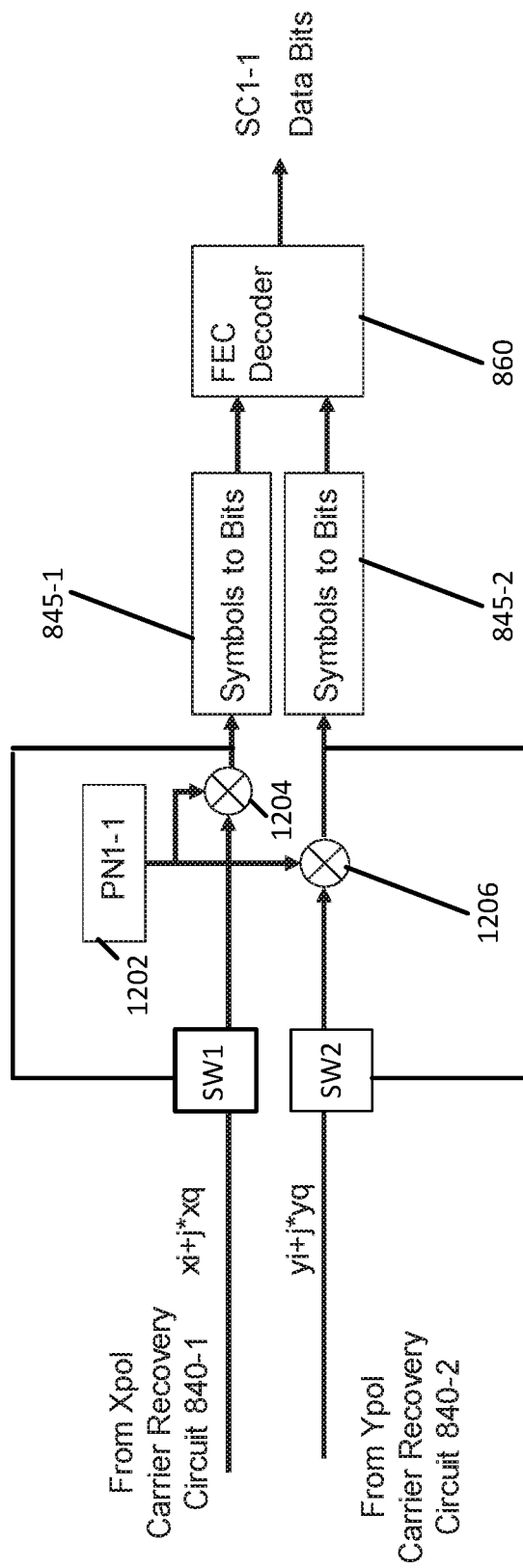
FIG. 15 shows an example of a portion of a DSP consistent with a further aspect of the present disclosure.

Selective processing of data carried by subcarrier SC1, for example, in a secondary node will next be described with reference to FIG. 15, which shows circuitry similar to that described above in connection with FIG. 12. In FIG. 15, however, switches SW1 and SW2 are provided that selectively supply the output of carrier recovery circuits 840-1 and 840-2 directly to symbols to bits circuits 845-1 and 845-2, respectively, if subcarrier SC1 does not carry CDMA encoded data. If subcarrier SC1 carries CDMA encoded data, however, switches SW1 and S2 are configured to supply the outputs of carrier recovery circuits 840-1 and 840-2 to multiplier circuits 1204 and 1206, which multiply such outputs by a code supplied by code generator 1202. The resulting products are decoded and processed in a manner similar to or the same as that described above in connection with FIG. 8.

Control of switches SW1 and SW2 in the above examples may be based on control channel data or information carried either in-band or by an out-of-band channel, such as a subcarrier sideband or subcarrier dedicated to carrying such information.

Consistent with a further aspect of the present disclosure, the secondary nodes may be oversubscribed, such that the collective capacity or bandwidth of the secondary nodes exceeds that of the primary node. Typically, however, it may not be necessary for all secondary nodes communicate with the primary node at the same time. Accordingly, based on control channel information exchanged between primary and secondary nodes in a manner similar or the same as that described above certain nodes may be activated or deactivated to receive or transmit data to thereby optimize usage of a network including such nodes.

Thus, in the above examples, transmitter 202 includes a laser 408 operable to output an optical signal including a plurality of subcarriers SC1 to SCn. In addition, DSP 402 is provided that receives data, SC Data 1 to SC Data n and SC1-1 Data Bits to SC1-K data bits. DSP 402 also provides electrical signals to DACs 404, as shown in FIG. 4. Based on these electrical signals, a modulator constituted by MZMs 410-1 to 410-4, phase shifters 412 and PBC 414 supplies the optical signal. As noted above, one of the plurality of subcarriers SC1 carries first information indicative of a first portion of the data, such as the SC1-1 data bits, and second information indicative of a second portion of the data, such as the SC1-2 data bits. The first information is associated with a first node, such as a first secondary node 112 remote from the transmitter and the second information is associated with a second secondary node 112 remote from the transmitter. In addition, as discussed above in connection with FIGS. 10a and 10, the first information is based on a first spreading code, such as the code output from code generator PN1-1 and a first plurality of symbols output from multiplier 1404-1 and the second information is based on a second spreading code output from code generator PN1-2 and a second plurality of symbols output from multiplier 1404-2, for example.

Moreover, as noted above in connection with FIGS. 13 and 14, the modulator including 410-1 to 410-4, phase shifters 412 and PBC 414 supplies the optical signal including a plurality of optical subcarriers SC1 to SCn based on the plurality of electrical signals output from DSP 402 noted above. As further noted above, in one example, one of the subcarriers carries non-CDMA encoded information, while other subcarriers carry CDMA encoded information based on first and second codes supplied by the code generators. The first code is associated with and is intended to encode information for receipt by a first secondary node 112 remote from the primary node 110, and the second code is associated with and is intended to encode information intended for a second secondary node 112. Further, the non-CDMA encoded information be associated with and intended for a third secondary node 112.

In the examples described above in connection with FIG. 4-15, subcarriers are transmitted in the downlink. Uplink transmission of subcarriers from the secondary nodes to the primary node will next be described with reference to FIGS. 16-23.

Figure 16:
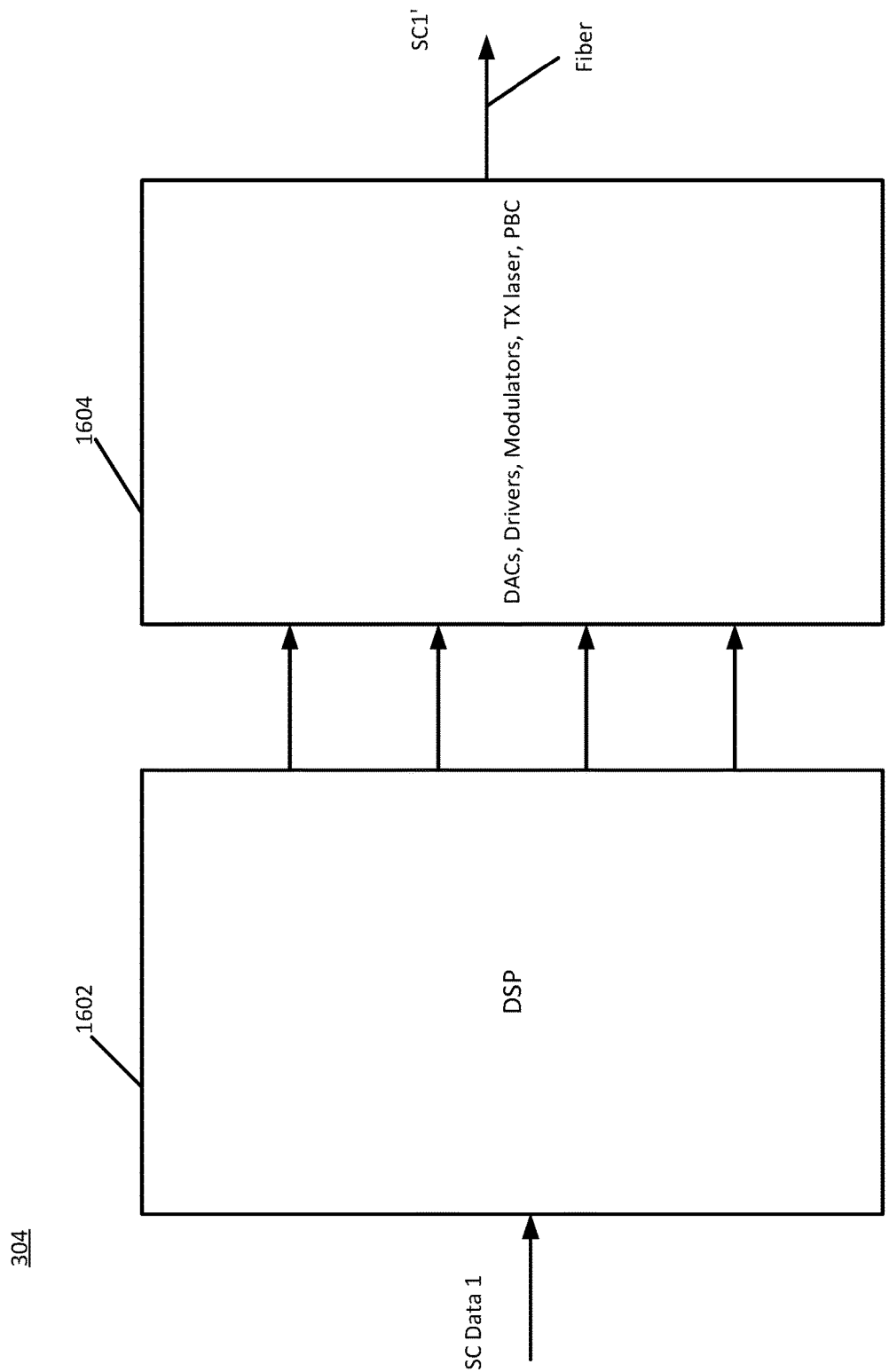
FIG. 16 shows an example of a secondary node transmitter circuit consistent with an aspect of the present disclosure.

FIG. 16 shows secondary node transmitter 304 in greater detail. Transmitter 304 may include a DSP 1602 that receives input data SC Data 1'. Such input data is processed by D/A to supply electrical digital signals to D/A and optics block 1601 having similar structure as block 401 (see FIG. 4). Based on such digital signals, D/A and optics block 1601 may output a modulated optical signal. For example, D/A and optics block 1601, like block 401, includes D/A converter circuits, driver circuits and MZ modulators arranged and connected in a manner similar to that shown in FIG. 4 to output a modulated optical signal to primary node 110 based on digital signals output from DSP 1602. In the example shown in FIG. 16, however, the modulated optical signal includes one subcarrier, SC1', having X and Y polarization components, instead of a plurality of subcarriers, as in the example shown in FIG. 4. In a further example, SC1' has frequency f1 and is output on a fiber different than the that which supplies subcarrier SC1 to at least one of secondary nodes 112.

Figure 17:
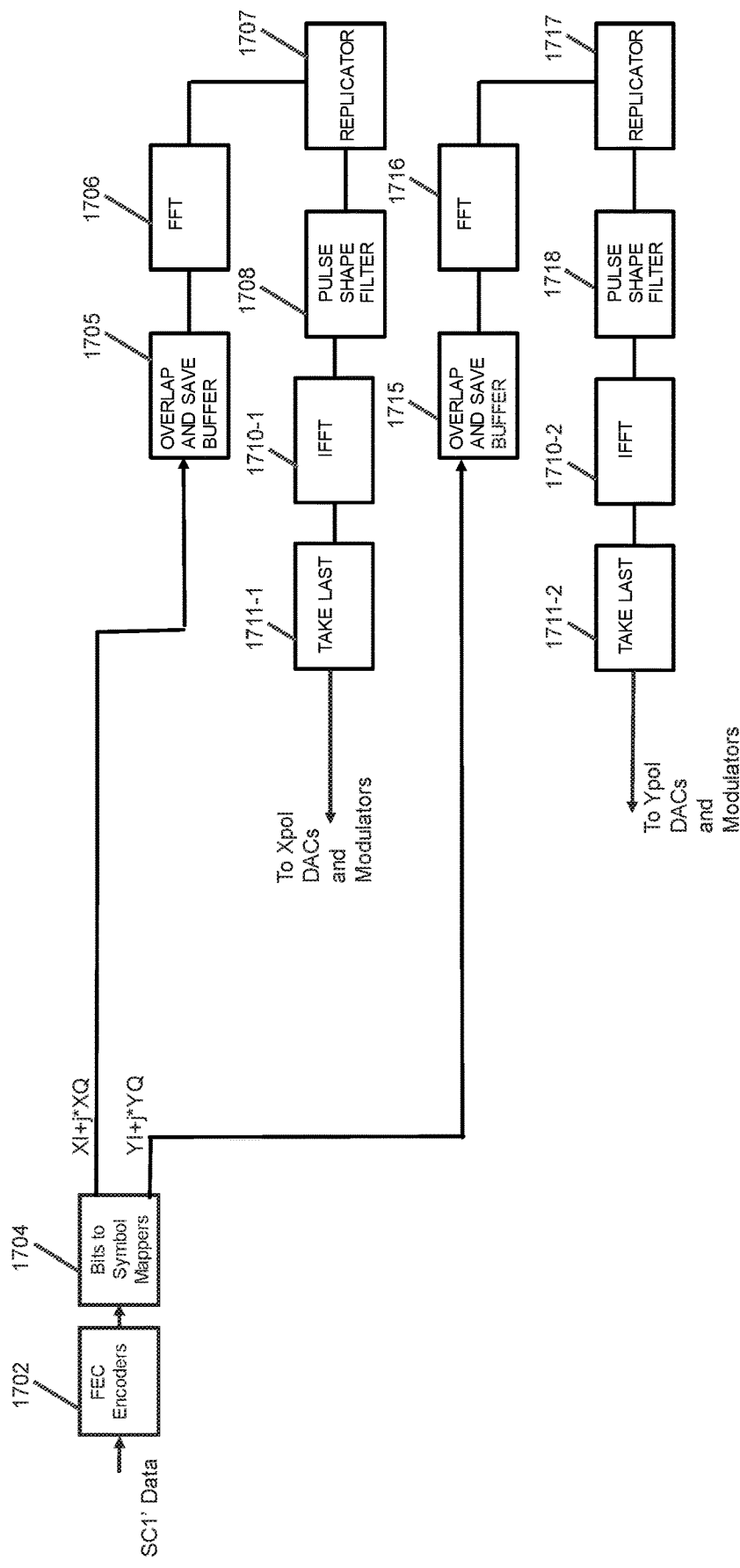
FIG. 17 shows an example of a secondary node transmitter DSP consistent with an aspect of the present disclosure.

FIG. 17 shows DSP 1602 in greater detail. DSP 1602 may include FEC encoder 1702, which may receive an input data stream SC Data 1' from a data source and carry out error correction coding on the input data stream, such as through the addition of parity bits. FEC encoder 1702 may further provide timing skew between the subcarriers to correct for skew induced by link between nodes 110 and 112-1 to 112-n described above.

FEC encoder 1702 provides an output to bits-to-symbol circuit 1704, which may map the encoded bits to symbols on a complex plane. For example, bits to symbol circuits 1704 may map four bits to a symbol in a dual-polarization QPSK constellation. Bits to symbol circuits 1704 provides first symbols, having the complex representation XI+j*XQ, associated with SC Data 1'. Data indicative of such first symbols is carried by the X polarization component of the polarization multiplexed modulated optical signal output from D/A and optical block 1601.

Bits to symbol circuit 1704 may further provide second symbols, having the complex representation YI+j*YQ, also associated with SC Data 1'. Data indicative of such second symbols, however, is carried by the Y polarization component of the polarization multiplexed modulated optical signal output from D/A and optical block 1601.

As further shown in FIG. 17, each of the first symbols output from bits to symbol circuit 1004 is supplied to overlap and save buffer or memory 1705, which may buffer 256 symbols, for example. Overlap and save buffer 1705 may receive 128 of the first symbols or another number of such symbols at a time from bits to symbol circuit 1004. Thus, overlap and save buffer 1705 may combine 128 new symbols from bits to symbol circuit 1705, with the previous 128 symbols received from bits to symbol circuit 1705.

Overlap and save buffer 1705 supplies an output, which is in the time domain, to fast Fourier Transform (FFT) circuit 1706. In one example, the output includes 256 symbols or another number of symbols. FFT 1706 converts the received symbols to the frequency domain using, for example, a fast Fourier transform. FFT 1706 may include 256 memories or registers, also referred to as frequency bins, that store frequency components associated with the input symbols. Replicator component or circuit 1707 may replicate the 256 frequency components associated with FFT 1706 and store such components in 512 or another number of frequency bins (e.g., for T/2 based filtering of the subcarrier) in replicator component 1707. Such replication may increase the sample rate.

Pulse shape filter circuit 1708 may apply pulse shaping filtering to the data stored in the 512 frequency bins of replicator components 1707 to thereby provide a respective one of a plurality of filtered outputs, which are multiplexed and subject to an inverse FFT, as described below. Pulse shape filter circuits 1708 calculates the transitions between the symbols and the desired spectrum so that subcarrier SC1' may be packed together with other subcarriers on the channel or fiber, e.g., with a close frequency separation. Pulse shape filter circuit 1708 may also be used to introduce timing skew between the subcarriers to correct for timing skew induced by links between nodes shown in FIGS. 1b-1c, for example.

Next, IFFT circuit or component 1710-1 may receive an output from pulse shape filter 1708 and provide a corresponding time domain signal or data based on an inverse fast Fourier transform (IFFT). In one example, the time domain signal may have a same rate of 64 GSample/s. Take last buffer or memory circuit 1711-1 may select the last 1724 or another number of samples from IFFT component 1710-1 and output the samples to DACs in D/A and optics box 1601 at a rate of 64 GSample/s, for example. As noted above, block 1601 has a similar construction and has similar circuitry as block 401 discussed above in connection with FIG. 4. Accordingly, block 1601, like block 401 has a first DAC (similar to DAC 404-1) is associated with the in-phase (I) component of the X pol signal and a second DAC (similar to DAC 404-2) is associated with the quadrature (Q) component of the Y pol signal. Accordingly, consistent with the complex representation XI+jXQ, the first DAC receives values associated with XI and the second DAC receives values associated with jXQ. As noted above in connection with FIG. 4, based on these inputs, the DAC provide analog outputs to MZM driver circuits, respectively, as discussed above. As further noted above, such MZM driver circuits may also be provided in D/A and optics block 1601.

As further shown in FIG. 17, bits to symbol circuits 1704 outputs symbols indicative of data carried by the Y polarization component of the polarization multiplexed modulated optical signal output from D/A and optics block 1601. As further noted above, these symbols may have the complex representation YI+j*YQ. Each such symbol may be processed by overlap and save buffer 1715, FFT circuit 1716, replicator component or circuits 1717, pulse shape filter circuit 1718, IFFT 1710-2, and take last buffer or memory circuit 1711-2, to provide processed symbols having the representation YI+j*YQ in a manner similar to or the same as that discussed above in generating processed symbols XI+j*XQ output from take last circuit 1711-1. In addition, symbol components YI and YQ are provided to third (e.g., DAC 404-3) and fourth (e.g., DAC 404-4) DACs, respectively, in D/A and optics block 1601. Based on these inputs, corresponding DACs provide analog outputs to respective MZM driver circuits in D/A and optics block 1601, respectively, as further discussed above in connection with FIG. 4.

While FIG. 17 shows DSP 1602 and block 1601 as including a particular quantity and arrangement of functional components, in some implementations, DSP 1602 and block 1601 may include additional functional components, fewer functional components, different functional components, or differently arranged functional components.

MZM driver circuits in D/A and optics block 1601 (see FIG. 16) drive the MZ modulators to modulate light or an optical signal output from a laser, also included in D/A optics block 1601 (similar to laser the Tx laser discussed above in connection with FIG. 4), optical subcarrier SC1' is output onto an optical fiber, which is coupled to the secondary node 112. In one example, each of additional subcarriers SC2' to SCn' may be provided in a similar fashion from respective secondary nodes 112 in FIGS. 1b-1d and 2. In a further example, subcarriers SC1' to SCn' output from such secondary nodes are combined or aggregated and supplied to receiver circuit 204 in primary node 110 (see FIG. 3). Receiver circuit 204 will next be described with reference to FIG. 18.

Figure 18:
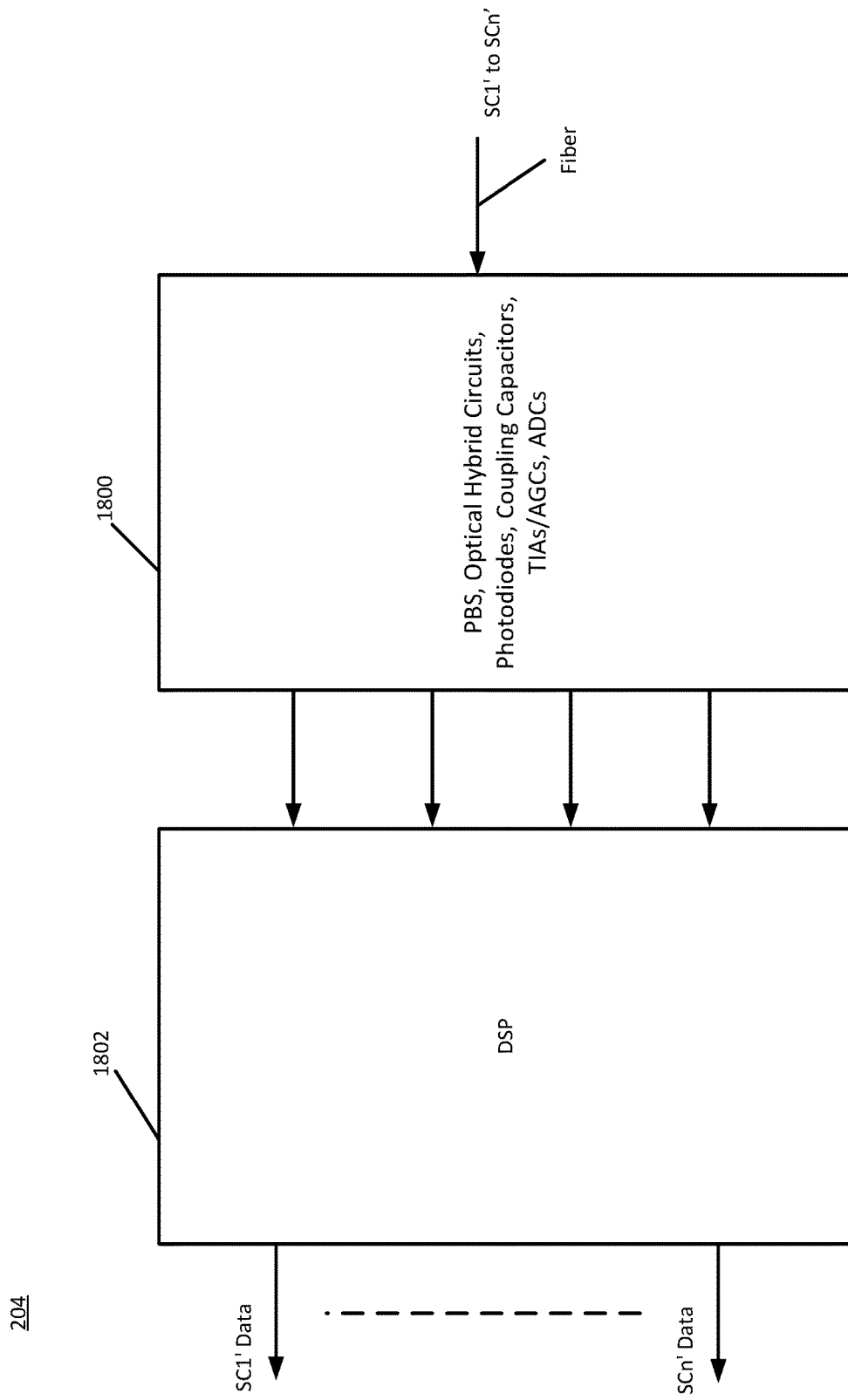
FIG. 18 shows a primary node receiver consistent with a further aspect of the present disclosure.

As shown in FIG. 18, primary node receiver circuit 204 may include Rx optics and A/D block 1800 having a similar construction as Rx optics and A/D block 600 shown in FIG. 6. For example, Rx optics and A/D block 1800 includes a polarization beam splitter local oscillator, 90 degree optical hybrids, detectors (each including either a single photodiode or balanced photodiode), AC coupling capacitors, transimpedance amplifiers/automatic gain control circuits, and analog to digital conversion circuits. Each of these circuits and components may be configured and connected as shown in FIG. 6.

In a manner similar to that described above in connection with FIG. 6, block 2200 carries out coherent detection to supply digital samples XI, XQ, YI, and YQ corresponding to the X polarization in-phase component, X polarization quadrature component, Y polarization in-phase component, and Y polarization quadrature component, respectively. Unlike Rx optics and A/D block 600, however, block 1800 in primary node 110 supplies XI, XQ, YI, and YQ digital samples associated with an aggregated plurality of subcarriers SC1' to SCn' output from secondary nodes 112. Based on the received digital samples, DSP 1802 outputs data SC'Data-1 to SC'Data-n carried by a respective one of subcarriers SC1' to SCn'. Processing of the digital samples output from block 1800 will next be described in greater detail with reference to FIG. 19, which shows examples of various circuits included DSP 1802.

DSP 1802 comprises Rx DSP portion 1903, which includes overlap and save buffers 1905-1 and 1905-2, FFT components or circuits 1910-1 and 1910-2, demultiplexer components or circuits 1911-1 and 1911-2, chromatic dispersion (CD) equalizer components (CDEQs) or circuits 1912-1-1 to 1912-1-n and 1912-2-1 to 1912-2-n, polarization mode dispersion (PMD) equalizer components or circuit 1925-1 to 1925-n, IFFT components or circuits 1930-1-1 to 1930-1-n (associated with the X pol of each subcarrier) and 1930-2-1 to 1930-2-n (associated with the Y polarization of each subcarrier), carrier recovery components or circuits 1940-1-1 to 1940-1-n (associated with the X pol of each subcarrier) and 1940-2-1 to 1940-2-n (associated with the Y polarization of each subcarrier), symbols to bits components 1945-1-1 to 1945-1-n (associated with the X pol of each subcarrier) and 1945-2-1 to 1945-2-n (associated with the Y polarization of each subcarrier), and FEC decoders 1960-1 to 1960-n.

As noted above, analog-to-digital (A/D) circuits in Rx A/D and optics block 1100 output digital samples corresponding to the analog inputs supplied thereto. In one example, the samples may be supplied by each A/D circuit at a rate of 64 GSamples/s. The digital samples correspond to symbols carried by X polarization component of each optical subcarrier SC1' to SCn' and may be represented by the complex number XI+jXQ. The digital samples may be input to Rx DSP portion 1903 and provided to overlap and save buffer 1905-1. In one example, the FFT component 1910-1 receives the 2048 vector elements, for example, from the overlap and save buffer 1905-1 and convert the vector elements to the frequency domain using, for example, a fast Fourier transform (FFT). The FFT component 1910-1 may convert the 2048 vector elements to 2048 frequency components, each of which is stored in a register or "bin" or other memory, as a result of carry outing the FFT.

The frequency components are then supplied to a demultiplexer circuit 1911-1 which provides an output to each of chromatic dispersion equalizer circuits CDEQ 1912-1-1 to 1912-1-n, each of which may include a finite impulse response (FIR) filter that corrects, offsets or reduces the effects of or errors associated with chromatic dispersion of the transmitted optical subcarriers SC1' to SCn', in this example.

Figure 19:
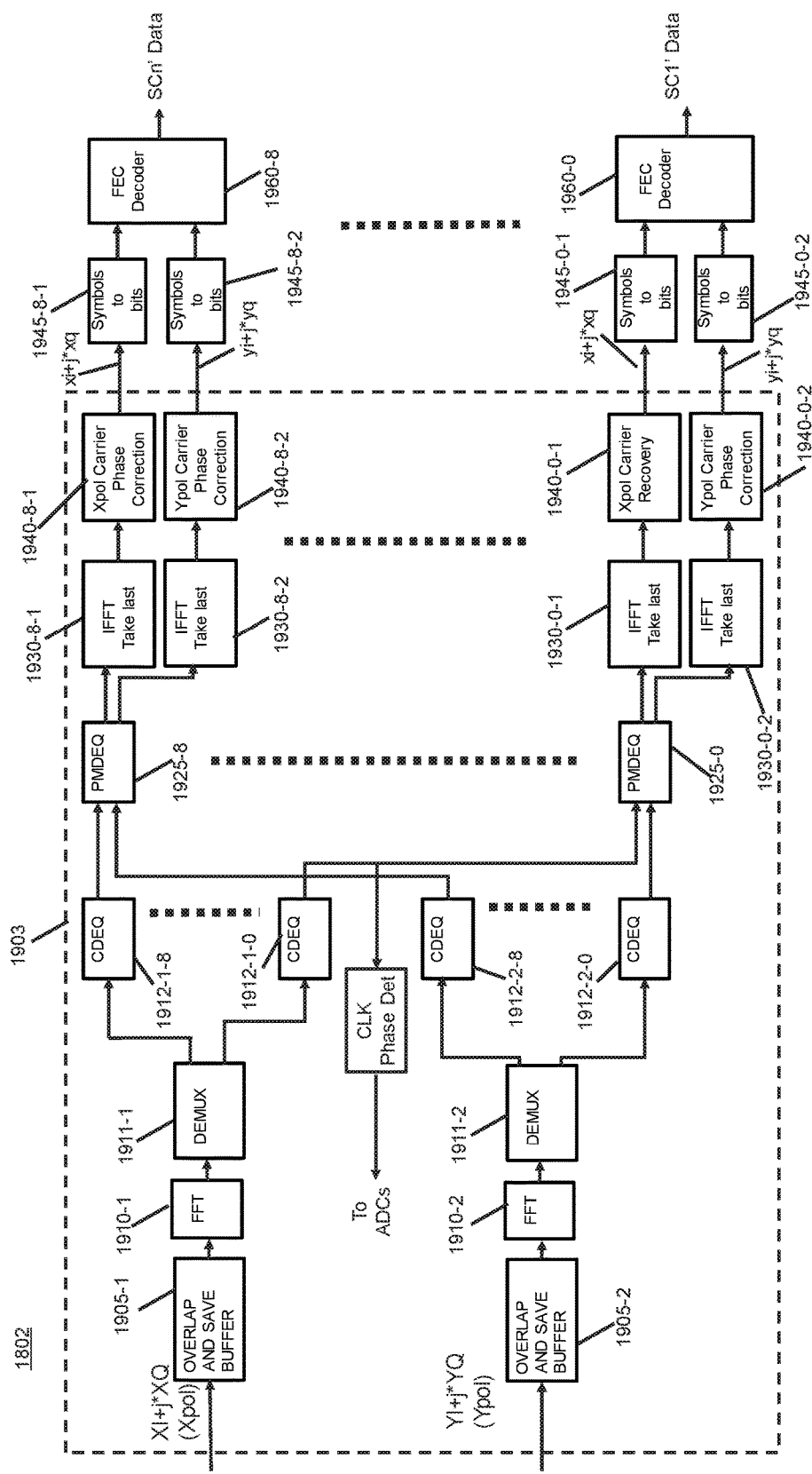
FIG. 19 shows a primary node receiver DSP consistent with an additional aspect of the present disclosure.

As further shown in FIG. 19, overlap and save buffer 1905-2 receives digital symbols represented by the complex notation $YI+j*YQ$. Overlap and save buffer 1905-2, FFT 1910-2 and demultiplexer circuit 1911-2 have the same or similar structure and operate in the same or substantially the same way as buffer 1905-1, FFT 1910-1 and 1911-1 to provide a plurality of outputs, each of which being supplied to a respective one of CDEQ circuits 1912-2-1 to 1912-2-n.

Each pair of outputs of the CDEQ circuits is supplied to a corresponding one of PMDEQ circuits 1925-1 to 1925-n. One output of the pair corresponds to the X polarization component of a respective one of subcarriers SC1' to SCn', and the other output of the pair corresponds to the Y polarization signal of that subcarrier. For example, CDEQ circuits 1912-1-1 and 1912-2-1 operate in a manner similar that described above to supply outputs to PMDEQ circuit 1925-1, and CDEQ circuit 1912-n-1 and 1912-n-2 supply outputs to PMDEQ circuit 1925-1-n. Each of PMDEQ circuits 1925-1 to 1925-n may include an FIR filter, for example, to correct, offset, or reduce effects of PMD, in a manner similar to that described above. Each of PMDEQ circuits 1925-1 to 1925-n supplies a further pair of outputs to a corresponding pair of IFFT circuits 1930-1-1, 1930-1-2; 1930-2-1, 1930-2-2; . . . 1930-n-1, 1930-n-2. The IFFT circuits operate in a manner similar to that described above to provide time domain data to corresponding pairs of carrier recovery circuits 1940-1-1, 1940-1-2; 1940-2-1, 1940-2-2; . . . 1940-n-1, 1940-n-2. The carrier recovery circuits operate in a manner similar to the carrier recovery circuits described above. One circuit in each carrier recovery pair provides recovered symbols having the complex representation $xi+j*xq$ associated with the X polarization component and the other circuit in the pair outputs recovered symbols having the complex representation $yi+j*yq$ associated with the Y polarization component of each of subcarriers SC1' to SCn'. Such x and y symbols are provided to corresponding symbols to bits circuits, such that the x symbols $(xi+j*xq)$ supplied from each of carrier recovery circuits 1940-1-1 to 1940-n-1 is provided to a corresponding one of symbols to bits circuits 1945-1-1 to 1945-n-1, and the y symbols $(yi+j*yq)$ supplied from each of carrier recovery circuits 1940-1-2 to 1940-n-2 is provided to a corresponding one of symbols to bits circuits 1945-1-2 to 1945-n-2. Such symbols to bits circuits map the received symbols back to bits in a manner similar to that described above.

As further shown in FIG. 19, FEC decoder circuits 1960-1 to 1960-n are provided to provide forward error correction decoding of the outputs from pairs of the symbols to bits circuits in a manner similar to that described above. For example, FEC decoder 1960-1 receives outputs from bit to symbol pair 1945-1-1 and 1945-1-2; FEC decoder 1960-2 receives outputs from bit to symbol pair 1945-2-1 and 1945-2-2; . . . FEC decoder 1960-n receives outputs from bit to symbol pair 1945-n-1 and 1945-n-2. Each of FEC decoders 1960-1 to 1960-n, in turn outputs data associated one of SC1' to SCn', namely a respective one of data streams SC1' Data to SCn' Data.

While FIG. 19 shows DSP 2202 as including a particular quantity and arrangement of functional components, in some implementations, DSP 1802 may include additional functional components, fewer functional components, different functional components, or differently arranged functional components.

CDMA subcarrier uplink transmission from a second node to primary node 110 will next be described with reference to FIG. 20. In one example, such transmission includes asynchronous CDMA encoding.

Figure 20:
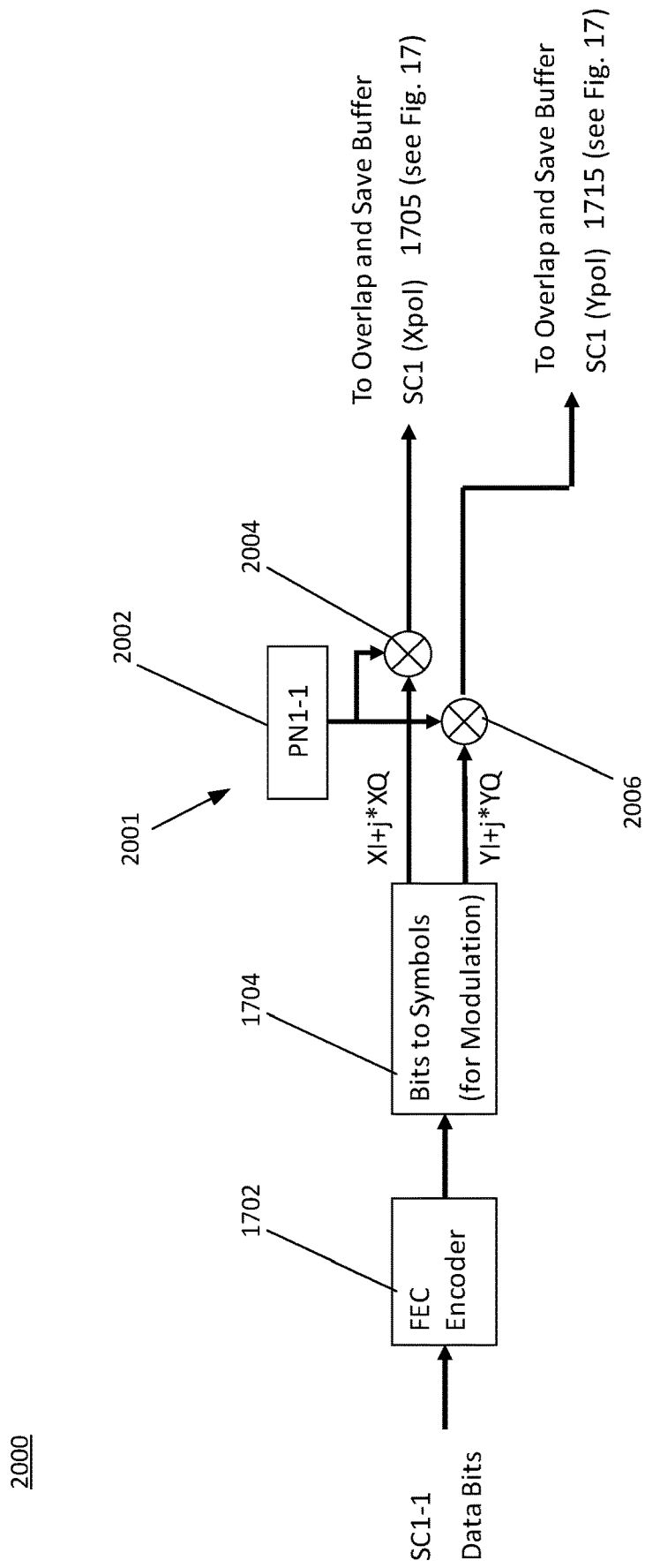
FIG. 20 shows an example of a portion of a secondary node transmitter DSP that CDMA encodes data to be transmitted.

FIG. 20 illustrates a secondary node input circuit 2000, which may be provided in DSP 1602 at the output of one of bits to symbol mapper 1704 (see FIG. 17). For example, input circuit 2000 includes an FEC encoder 1702, which, as noted above, receives user data SC1-1' that is input to one of secondary nodes 112. FEC encoder 1702 supplies an output to bits to symbol mapper circuit 1704. Operation of FEC encoder circuit 1702 and bits to symbol mapper 1704 is described above in regard to FIG. 17. In addition, CDMA encoder circuit 2001 operates in a manner similar to that described above in connection with encoders 1310-1 (see FIG. 10a). For example, encoder circuit 2001 includes a code generator 2002, such as PN code generator that generates PN code PN1-1 associated with one of the secondary nodes 112. In addition, encoder circuit 2001 includes multiplier circuits 2004 and 2006, each of which multiplying respective symbols output from bits to symbols $(XI+j*XQ$ and $YI+j*YQ)$ circuit 1704 by the PN code, for example. The resulting products are supplied to overlap and save buffers 1705 and 1715 (see FIG. 17).

Such products are further processed, as described above in connection with FIG. 17, to provide outputs to modulators in D/A and optical block 1601 to generate an optical subcarrier, such as SC1', which may have frequency f1 and may carry data indicative of the code generated by generator circuit 2002. Other secondary nodes 112 may output subcarrier SC1' at frequency f1, but such outputs carry data indicative of other orthogonal codes, for example, other PN codes, wherein a total of K such codes are generated collectively by K secondary nodes (K being an integer). Moreover, additional secondary node groupings, each having K or another number of secondary nodes, may generate a common subcarrier, e.g., SC2', that carries data indicative of a plurality of codes, where each code is associated with and encodes data or information output from a corresponding secondary node in each such grouping.

Figure 21:
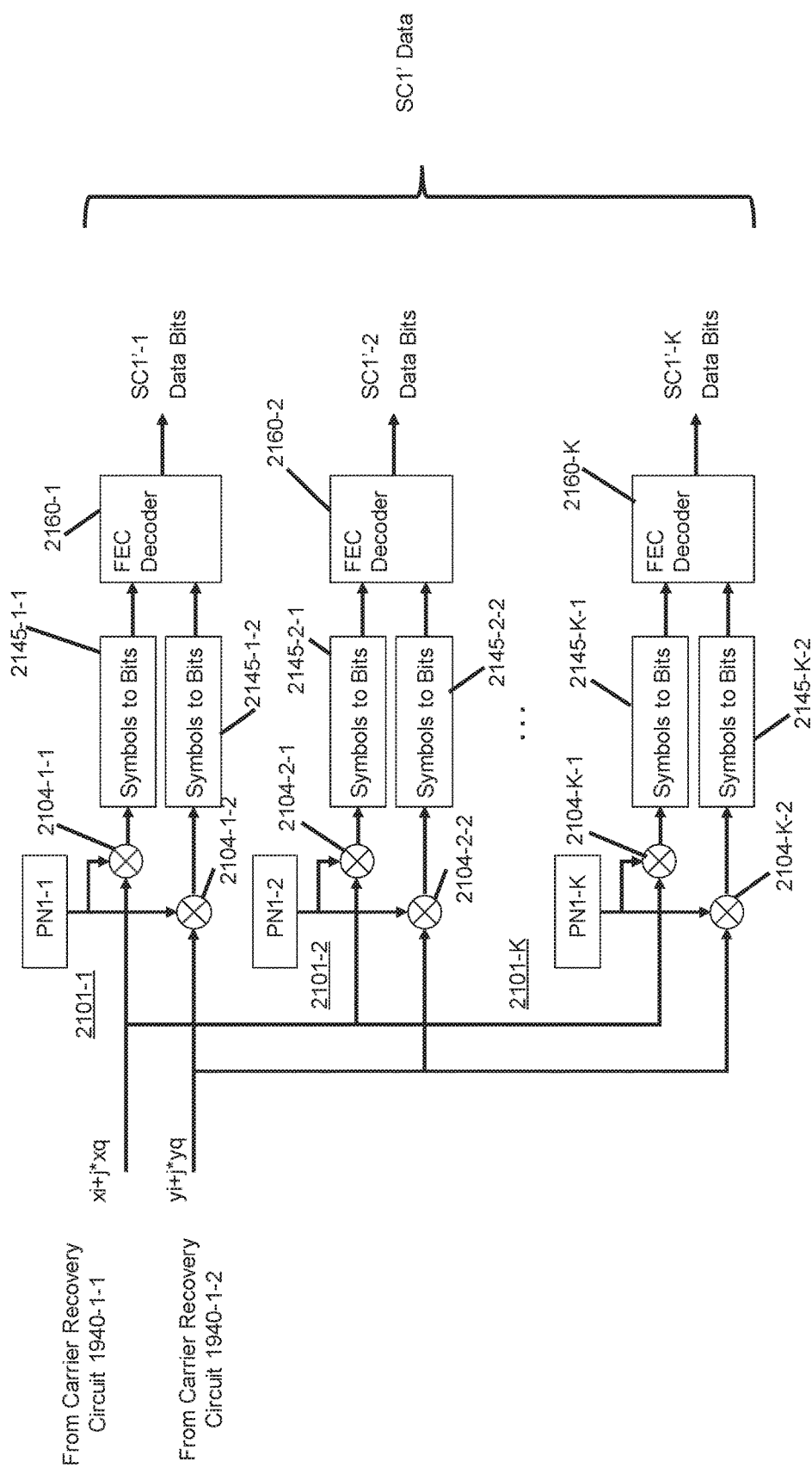
FIG. 21 shows an example of a portion of a primary node receiver DSP that processes CDMA encoded data.

As noted above with reference to FIG. 1d, optical subcarriers, here SC1' to SCn', may be aggregated and supplied to primary node receiver 204 (FIG. 2). As further noted above with respect to FIG. 18, receiver 204 includes A/D and optical block 1802, which in conjunction with DSP 1802, may carry out coherent detection the optical subcarriers received from the secondary nodes. In order to detect CDMA encoded data, however, primary node receiver DSP 1802 may be modified, as shown in FIG. 21 to include decoding blocks 2101-1 to 2101-k that receive outputs from carrier recovery circuits 1940-1-1 and 1940-1-2. It is understood that decoder blocks having a similar structure and operating in a similar manner as that described herein may also be provided at the outputs of the remaining carrier recovery circuits in order to decode such carrier recovery outputs.

As shown in FIG. 21, each decoder block 2101-1 to 2101-K may be provided to decode user data SC1-1 Data' to SC1-K Data' associated with a respective the outputs of secondary nodes 112 that are carried by one of the subcarriers, such as subcarrier SC1'. It is understood that other groupings of decoder blocks may be provided in DSP 1802 having the same or similar construction and operating in the same or similar manner as decoder block 2101-1 to 2101-K to output a plurality of user data streams associated with CDMA encoded subcarriers SC2' to SCn'.

Decoding blocks 2101-1 to 2101-K are shown in greater detail in FIG. 21. As shown in FIG. 21, each of decoder circuits 2101-1 to 2101-K receives X symbols (xi+j*xq) and Y symbols (yi+j*yq) from carrier recovery circuits 1940-1-1 and 1940-1-2, respectively. Each decoder circuits 2101-1 to 2101-K includes a respective one of code generator circuits PN1-1 to PN1-K, a respective one of first multiplier circuits 2104-1-1 to 2104-1-K, and a respective one of second multiplier circuits 2104-2-1 to 2104-2-K. The X symbols may be multiplied by the PN codes, for example, output from code generators PN1-1 to PN1-K by a respective one of multiplier circuits 2104-1-1 to 2104-1-K, and the Y symbols may also be multiplied by such codes by a respective one of multiplier circuits 2104-2-1 to 2104-2-K. The code output from code generator PN1-1 in FIG. 21 matches the code output from generator 2002 in one of the secondary nodes. Accordingly, the X and Y symbols output from such secondary node will be decoded by the multiplication operation described above. Such symbols are supplied to symbols to bits circuits 2145-1-1 and 2145-1-2, respectively, and the resulting bits output from 2145-1 and 2145-1-2 are output to FEC decoder 2160-1. Error correction coding is then carried out on the bits provided from circuits 2145-1-1 and 2145-1-2 to output data bits SC1'-1.

In a similar manner, the codes output from remaining primary node code generators PN1-2 to PN1-K decode received symbols by way of multiplication with corresponding multiplier circuits 2104-2-1/2704-2-2 to 2104-K-1/2704-K-2. The symbols output from the multiplier circuits are then converted to bits in circuits 2145-2-1/2145-2-2 to 2145-K-1/2145-K-2, the outputs of which are fed to a corresponding one FEC decoders 2160-2 to 2160-K. As a result, decoded bits SC1'-2 to SC1'K are output, such all the data associated with subcarrier SC1' is output from primary receiver 204, namely, SC1'-1 Data to SC1'-K Data.

Figure 22:
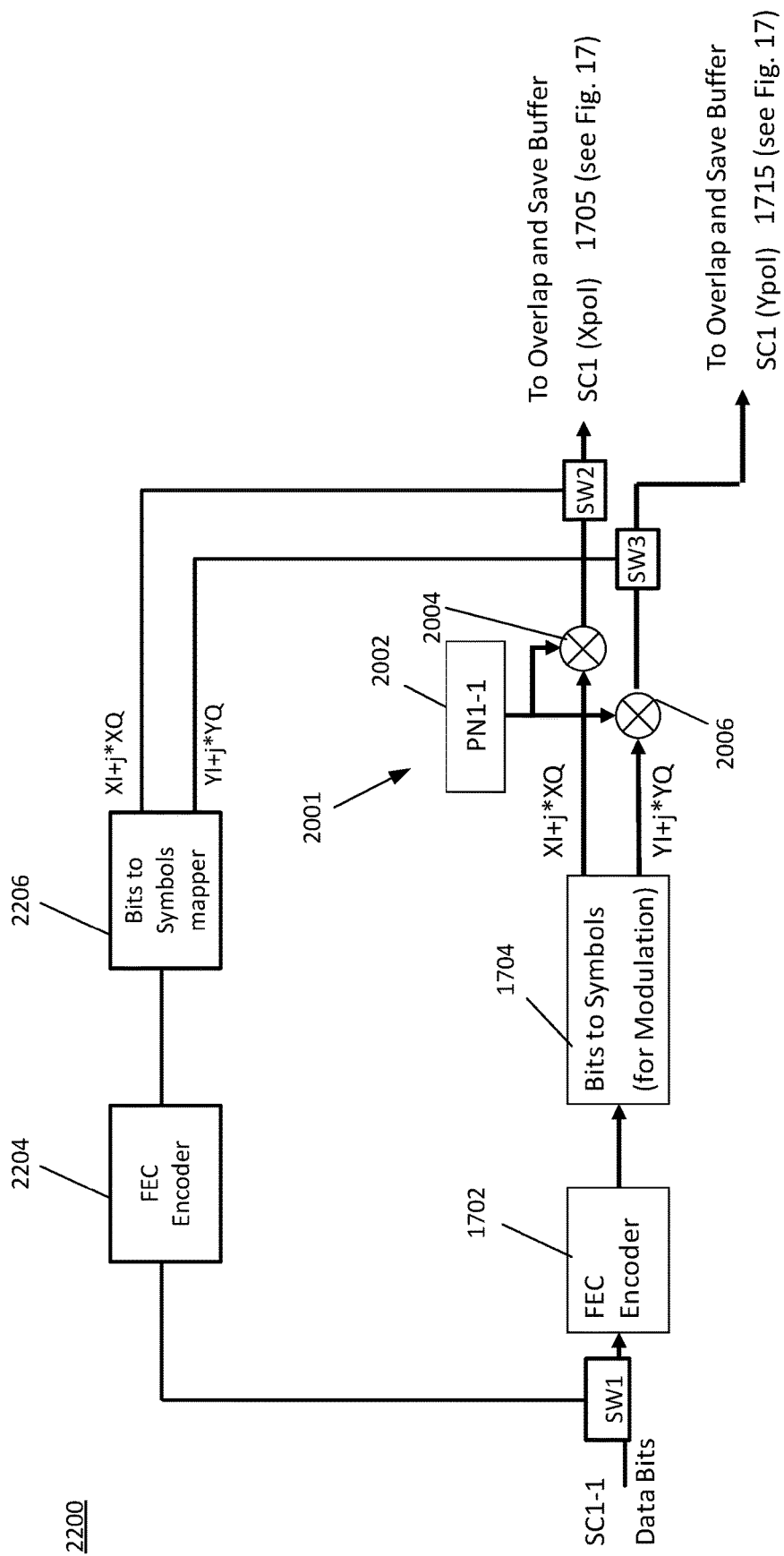
FIG. 22 shows an example of a portion of a secondary node transmit DSP that can selectively transmit CDMA encoded data and non-CDMA encoded data.

FIG. 22 illustrates an alternative input circuit 2200 consistent with a further aspect of the present disclosure. Input circuit 2200 is similar to input circuit 2000 described above but includes switches SW1 to SW3 to facilitate selective uplink transmission of CDMA encoded or non-CDMA encoded data. If CDMA encoded transmission is desired, switches SW1, SW2, and SW3 are configured to supply SC1-1 Data bits for processing by circuits 1702, 1704, and 2001 in a manner described above in connection with FIG. 20. On the other hand, for non-CDMA transmission, switch SW1 is configured to supply the SC1-1 Data bits to FEC encoder 2204, which encodes such data bits and supplies the data bits to bits to symbol mapper 2206. As further shown in FIG. 22, bits-to-symbol mapper 2206, in turn, outputs X and Y symbols to switches SW2 and SW3, respectively, which, in this case, are configured to supply the X and Y symbols to corresponding overlap and save buffers 1705 and 1715 for further processing, as described above.

Figure 23:
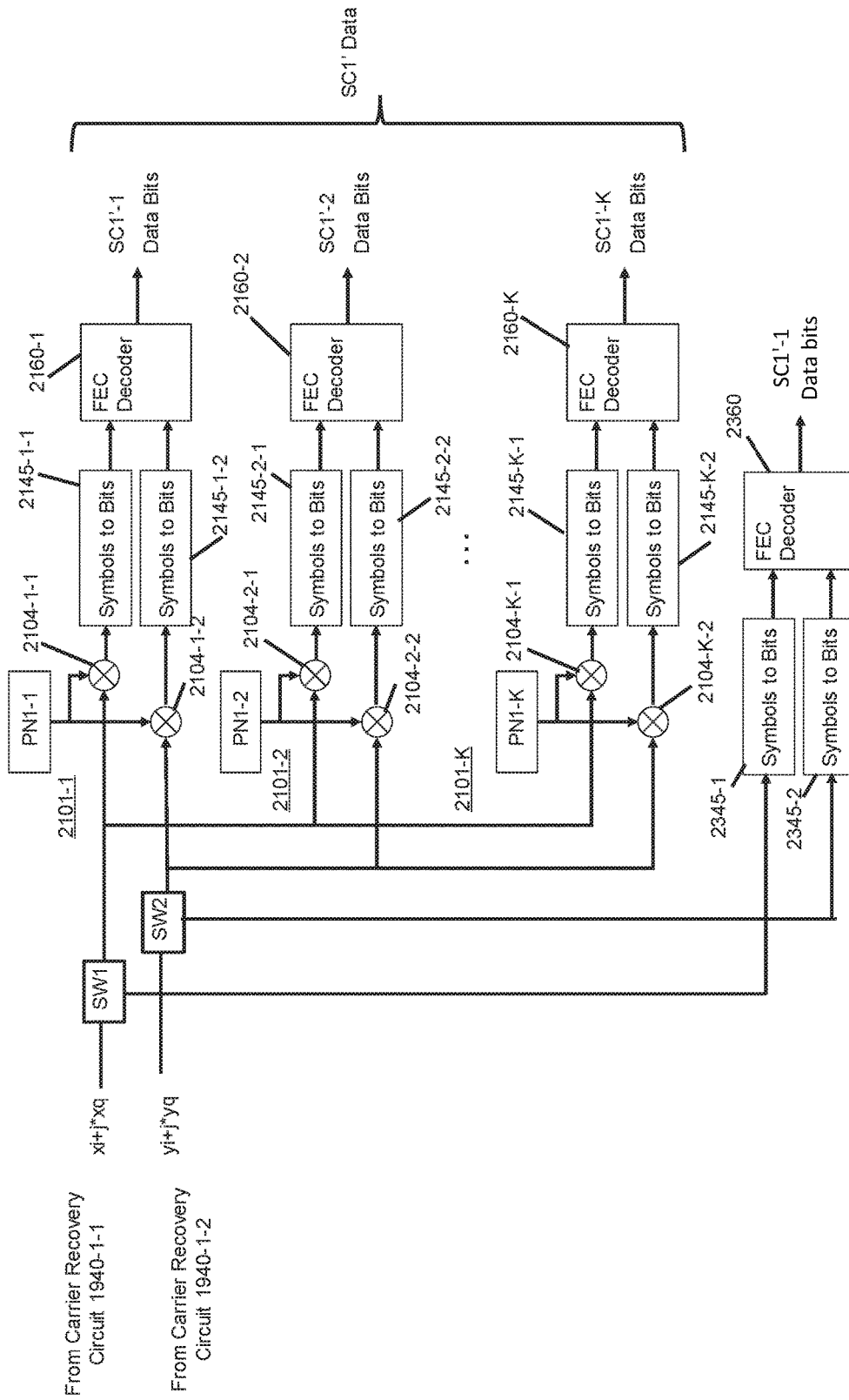
FIG. 23 shows an example of a portion of a primary node receiver DSP that selectively processes CDMA encoded data or non-CDMA encoded data.

FIG. 23 shows an alternative example of a portion of a primary node receiver DSP that selectively processes CDMA encoded data or non-CDMA encoded data. The DSP portion shown in FIG. 23 is similar to that shown in FIG. 21, except that the DSP portion shown in FIG. 23 includes switches SW1 SW2, and symbols to bits circuits 2345-1, 2345-2, and FEC Decoder 2360. If the received data is not CDMA encoded, switches SW1 and SW2 are configured to supply the data to decoder blocks 2101-1 to 2101-k, and processing of such received data to supply the SC1'-1 to SC1'-K data bits is carried out in a manner similar to that described above in connection with FIG. 23. If the received data is not CDMA encoded, however, switches SW1 and SW2 are configured to supply the outputs of carrier recovery circuits 1940-1-1 and 1940-1-2. respectively, to corresponding symbols to bits circuits 2345-1 and 2345-2. These symbol to bits circuit operate in a manner similar to that described above to provide an output to FEC decoder 2360, which provides SC1'-1 data provides, which in this example, were not subject to CDMA encoding.

Other embodiments will be apparent to those skilled in the art from consideration of the specification. It is intended that the specification and examples be considered as exemplary only, with a true scope and spirit of the invention being indicated by the following claims.

What is claimed is:

1. A transmitter, comprising:
    a laser operable to output an optical signal;
    a digital signal processor operable to receive data and provide a plurality of electrical signals based on the data;
    an optical modulator operable to receive the optical signal and modulate the optical signal to output a plurality of optical subcarriers based on the plurality of electrical signals, one of the plurality of optical subcarriers carries first information indicative of a first portion of the data and second information indicative of a second portion of the data, the first information being associated with a first node remote from the transmitter and the second information being associated with a second node remote from the transmitter, said one of the plurality of optical subcarriers having a first polarization and a second polarization;
    a code generator circuit, the code generator circuit being operable to supply a spreading code;
    a forward error correction encoder that receives the first portion of the data and provides encoded data;
    a bit-to-symbol mapper circuit operable to provide the first plurality of symbols and a second plurality of symbols based on the encoded data, the first plurality of symbols being associated with the first polarization and the second plurality of symbols being associated with the second polarization; and
    multiplier circuitry operable to multiply the first plurality of symbols associated with the first polarization by the spreading code and multiply the second plurality of symbols associated with the second polarization by the spreading code.

2. A transmitter in accordance with claim 1, wherein the first and second information is CDMA encoded.

3. A transmitter in accordance with claim 1, wherein each of the plurality of optical subcarriers is a Nyquist subcarrier.

4. A transmitter in accordance with claim 1, wherein each of the plurality of optical subcarriers does not spectrally overlap with another of the plurality of optical subcarriers.

5. A transmitter in accordance with claim 1, wherein the digital signal processor includes the code generator circuit.

6. A transmitter in accordance with claim 1, wherein the code generator circuit is a first code generator circuit and the spreading code is a first spreading code, the digital signal processor includes:

a second code generator circuit, the second code generator circuit providing a second spreading code.

7. A transmitter in accordance with claim 6, wherein the forward error correction encoder is a first forward error correction encoder, the digital signal processor includes:
a second forward error correction encoder that receives the second portion of the data and provides second encoded data.

8. A system, comprising:
a transmitter, including:
a laser operable to output an optical signal;
a digital signal processor operable to receive data and provide a plurality of electrical signals based on the data;
an optical modulator operable to receive the optical signal and modulate the optical signal to output a plurality of optical subcarriers based on the plurality of electrical signals, one of the plurality of subcarriers carries first information indicative of a first portion of the data and second information indicative of a second portion of the data, the first information being associated with a first node remote from the transmitter and the second information being associated with a second node remote from the transmitter, said one of the plurality of optical subcarriers having a first polarization and a second polarization;
a code generator circuit, the code generator circuit being operable to supply a spreading code;
a forward error correction encoder that receives the first portion of the data and provides encoded data;
a bit-to-symbol mapper circuit operable to provide the first plurality of symbols and a second plurality of symbols based on the encoded data, the first plurality of symbols being associated with the first polarization and the second plurality of symbols being associated with the second polarization;
multiplier circuitry operable to multiply the first plurality of symbols by the spreading code and multiply the second plurality of symbols by the spreading code;
a first receiver provided in a first node, the first receiver receiving being optically coupled to the transmitter; and
a second receiver provided in a second node, the second receiver being optical coupled to the transmitter, the first and second receivers being remote from the transmitter, such that the first information is associated with the first node and the second information is associated with a second node remote from the transmitter.

9. A system in accordance with claim 8, wherein the first and second information is CDMA encoded.

10. A system in accordance with claim 8, wherein each of the plurality of optical subcarriers is a Nyquist subcarrier.

11. A system in accordance with claim 8, wherein each of the plurality of optical subcarriers does not spectrally overlap with another of the plurality of optical subcarriers.

12. A system in accordance with claim 8, wherein the digital signal processor includes the code generator circuit.

13. A system in accordance with claim 8, wherein the code generator circuit is a first code generator circuit and the spreading code is a first spreading code, the digital signal processor includes:
a second code generator circuit, the second code generator circuit providing a second spreading code.

14. A system in accordance with claim 13, wherein the forward error correction encoder is a first forward error correction encoder, the digital signal processor includes:
a second forward error correction encoder that receives the second portion of the data and provides second encoded data.

15. A receiver, comprising:
a local oscillator laser;
an optical hybrid circuit that receives a plurality of optical subcarriers and an optical signal supplied from the local oscillator laser, the optical hybrid circuit supplying a plurality of mixing products, one of the optical subcarriers having first and second polarizations and carrying first information based on a spreading code and first symbols and second information based on the spreading code and second symbols, the first symbols being associated with the first polarization and the second symbols being associated with the second polarization, the first information being designated for the receiver and the second information being designated for the receiver;
a photodiode circuit that receives the plurality of mixing products and outputs a plurality of electrical signals;
a digital signal processor that outputs, based on the plurality of electrical signals, data associated with the first information and the second information.

16. A receiver in accordance with claim 15, wherein the first and second information is code division multiple access (CDMA) encoded.

17. A system in accordance with claim 15, wherein each of the plurality of optical subcarriers is a Nyquist subcarrier.

18. A system in accordance with claim 15, wherein each of the plurality of optical subcarriers does not spectrally overlap with another of the plurality of optical subcarriers.

* * * * *